(12) United States Patent
Luo et al.

(10) Patent No.: US 11,550,572 B2
(45) Date of Patent: Jan. 10, 2023

(54) SPLITTING VECTOR INSTRUCTIONS INTO MICROINSTRUCTIONS FOR PARALLEL EXECUTION BASED ON INDEX COMPARISONS OF COMPLETED MICROINSTRUCTIONS

(71) Applicant: T-Head (Shanghai) Semiconductor Co., Ltd., Shanghai Free Trade Area (CN)

(72) Inventors: Jiahui Luo, Hangzhou (CN); Taotao Zhu, Hangzhou (CN); Chang Liu, Hangzhou (CN)

(73) Assignee: T-Head (Shanghai) Semiconductor Co., Ltd., Shanghai (CN)

( * ) Notice: Subject to any disclaimer, the term of this patent is extended or adjusted under 35 U.S.C. 154(b) by 0 days.

(21) Appl. No.: 17/510,198

(22) Filed: Oct. 25, 2021

(65) Prior Publication Data
US 2022/0147351 A1 May 12, 2022

(51) Int. Cl.
G06F 9/30 (2018.01)
G06F 9/22 (2006.01)
G06F 9/24 (2006.01)

(52) U.S. Cl.
CPC ............. *G06F 9/223* (2013.01); *G06F 9/226* (2013.01); *G06F 9/24* (2013.01); *G06F 9/30036* (2013.01)

(58) Field of Classification Search
CPC . G06F 9/223; G06F 9/226; G06F 9/24; G06F 9/30036
See application file for complete search history.

(56) References Cited

U.S. PATENT DOCUMENTS

| | | | |
|---|---|---|---|
| 5,123,095 A | 6/1992 | Papadopoulos et al. | |
| 5,200,999 A | 4/1993 | Matyas et al. | |
| 5,265,164 A | 11/1993 | Matyas et al. | |
| 5,471,593 A | 11/1995 | Branigin | |
| 8,996,923 B2 * | 3/2015 | Hughes | G06F 11/0772 714/48 |
| 9,927,902 B2 | 3/2018 | Burr et al. | |
| 10,267,850 B2 | 4/2019 | Mao et al. | |
| 2013/0331954 A1 | 12/2013 | McConnell et al. | |
| 2014/0136895 A1 | 5/2014 | Fleischer et al. | |

(Continued)

*Primary Examiner* — Jacob Petranek

(57) ABSTRACT

This disclosure provides an instruction transmitting unit, an instruction execution unit, and a related apparatus and method. The instruction transmitting unit includes: an instruction splitter adapted to split a to-be-executed vector instruction into microinstructions; a microinstruction index fetcher adapted to acquire a number-of-effective-elements index of the microinstructions resulting from the splitting based on an element range involved in the microinstructions; an index comparison subunit adapted to compare the acquired number-of-effective-elements index with a first index, where the first index is a number-of-effective-elements index of a fault-only-first microinstruction whose processing has not been completed; and a microinstruction transmission controller adapted to transmit the microinstructions resulting from the splitting to a vector execution unit for execution when the number-of-effective-elements index is less than the first index. This disclosure improves operating efficiency of subsequent vector instructions when a fault-only-first vector loading instruction is involved in chaining.

20 Claims, 13 Drawing Sheets

(56) References Cited

U.S. PATENT DOCUMENTS

| | | |
|---|---|---|
| 2015/0143073 A1 | 5/2015 | Winser et al. |
| 2017/0097824 A1 | 4/2017 | Elmer et al. |
| 2017/0286110 A1 | 10/2017 | Agron et al. |
| 2018/0203756 A1* | 7/2018 | Stephens ............. G06F 9/30043 |
| 2018/0253309 A1* | 9/2018 | Stephens ............. G06F 9/30036 |
| 2018/0253310 A1* | 9/2018 | Stephens ............... G06F 9/3013 |
| 2018/0285113 A1 | 10/2018 | Ko et al. |
| 2018/0293078 A1* | 10/2018 | Gabrielli ............. G06F 9/30036 |
| 2019/0303159 A1 | 10/2019 | Fryman et al. |
| 2020/0192742 A1* | 6/2020 | Boettcher ........... G06F 11/0721 |
| 2021/0209052 A1 | 7/2021 | Chen et al. |
| 2022/0229663 A1 | 7/2022 | Martinez et al. |

\* cited by examiner

|  | Clock cycle 1 | Clock cycle 2 | Clock cycle 3 | Clock cycle 4 | ... |
|---|---|---|---|---|---|
| Instruction A | Microinstruction A-1 | Microinstruction A-2 | Microinstruction A-3 | ... | |
| Instruction B | | Microinstruction B-1 | Microinstruction B-2 | Microinstruction B-3 | ... |

FIG. 9

| VREG_NUM = 8 | 1111 | 1110 | 1101 | 1100 | 1011 | 1010 | 1001 | 1000 | 0111 | 0110 | 0101 | 0100 | 0011 | 0010 | 0001 | 0000 |
|---|---|---|---|---|---|---|---|---|---|---|---|---|---|---|---|---|
| VREG_NUM = 4 | 1111 | | 1101 | | 1011 | | 1001 | | 0111 | | 0101 | | 0011 | | 0001 | |
| VREG_NUM = 2 | 1111 | | | | 1011 | | | | 0111 | | | | 0011 | | | |
| VREG_NUM = 1 | 1111 | | | | | | | | 0111 | | | | | | | |

FIG. 12

SPLITTING VECTOR INSTRUCTIONS INTO MICROINSTRUCTIONS FOR PARALLEL EXECUTION BASED ON INDEX COMPARISONS OF COMPLETED MICROINSTRUCTIONS

TECHNICAL FIELD

The present invention relates to the chip field, and more specifically, to an instruction transmitting unit, an instruction execution unit, and a related apparatus and method.

BACKGROUND

Chaining (chaining) is an acceleration mechanism for vector execution. In chaining, when a subsequent vector instruction needs to perform an operation by using a result written by a previous vector instruction into a vector register as an operand, execution is not performed after execution of the entire previous vector instruction is completed; instead, the instruction is split into a plurality of microinstructions, and an execution result of a microinstruction whose execution is completed is output to the subsequent instruction in advance. In this way, the subsequent instruction can run if it gets results of some of the microinstructions of the previous instruction, without waiting for an execution result of the entire previous instruction, thereby reducing a waiting time and improving vector operation efficiency.

Number of effective elements (vl) is a control register parameter in a vector extension instruction set of a free and open reduced instruction set architecture, used to indicate the number of elements that need to be processed and updated in one vector instruction. One vector instruction may not process or occupy all elements of an entire control register. An occupied element is referred to as an effective element, and an idle and unoccupied element is referred to as an ineffective element. Generally, when a vector instruction is executed, on the one hand, an execution result of a previous vector instruction may be required, and on the other hand, an operation and writeback need to be performed with reference to the number of effective elements. A difference between a fault-only-first (FOF) instruction and a common vector loading instruction lies in that the common loading instruction responds to an exception when an access error occurs while any effective element is being loaded, but the fault-only-first instruction responds to an exception only when an access error occurs while element 0 (an element with the smallest sequence number) is being loaded, and if an element other than element 0 encounters an access error, only the number of effective elements is updated to a total number of elements processed without access errors. The fault-only-first instruction is the only instruction, in the vector extension instruction set of the free and open reduced instruction set architecture, that is capable of modifying the number of effective elements, except the setvl/setvli instruction specially used for setting the number of effective elements.

Usually, a vector instruction only needs to refer to the number of effective elements that is set by the setvl/setvli instruction. This parameter setting instruction is simple to execute and has a relatively short delay, and therefore causes no performance bottleneck. However, as an instruction that may change the number of effective elements, the fault-only-first vector loading instruction has an uncertain execution delay. A subsequent vector instruction needs to wait for the fault-only-first vector loading instruction to return whether the number of effective elements is updated and an updated value of the number of effective elements before the subsequent vector instruction can be executed correctly. If all subsequent vector instructions are executed by simply waiting for the fault-only-first vector loading instruction to confirm an update status of the number of effective elements, effects of chaining are greatly degraded.

SUMMARY

In view of this, embodiments of the present invention are intended to improve operating efficiency of subsequent vector instructions when a fault-only-first vector loading instruction is involved in chaining.

To achieve this objective, according to an aspect of this disclosure, an instruction transmitting unit is provided, including:

an instruction splitter adapted to split a to-be-executed vector instruction into microinstructions;

a microinstruction index fetcher adapted to acquire a number-of-effective-elements index of the microinstructions resulting from the splitting based on an element range involved in the microinstructions;

an index comparison subunit adapted to compare the acquired number-of-effective-elements index with a first index, where the first index is a number-of-effective-elements index of a fault-only-first microinstruction whose processing has not been completed; and a microinstruction transmission controller adapted to transmit the microinstructions resulting from the splitting to a vector execution unit for execution when the number-of-effective-elements index is less than the first index.

Optionally, the instruction transmitting unit further includes: an operand correlation judgment subunit adapted to determine whether execution of a first microinstruction is completed, where operands in the microinstructions resulting from the splitting depend on the first microinstruction; and the microinstruction transmission controller transmits the microinstructions resulting from the splitting to the vector execution unit for execution only when the execution of the first microinstruction is completed and the number-of-effective-elements index is less than the first index.

Optionally, the microinstruction index fetcher acquires the number-of-effective-elements index of the microinstructions resulting from the splitting based on the element range involved in the microinstructions according to the following formula:

$$vl\_index(i) = 8 \times (i+1)/VREG\_NUM - 1, \text{ where}$$

vl_index(i) is the number-of-effective-elements index, VREG_NUM is a number of vector registers to which the to-be-executed vector instruction needs to write back, i is a sequence number of the element range, and i=0, 1, 2, ..., VLEN×VREG_NUM/DPLEN−1, where VLEN is a bit width of a vector register, and DPLEN is a processing bit width of the vector execution unit.

Optionally, if VREG_NUM=8, a number-of-effective-elements index corresponding to an element range with the smallest sequence number is 0000, and with each addition of 1 to the sequence number of the element range, the number-of-effective-elements index is incremented by 0001.

Optionally, if VREG_NUM=4, a number-of-effective-elements index corresponding to an element range with the smallest sequence number is 0001, and with each addition of 1 to the sequence number of the element range, the number-of-effective-elements index is incremented by 0010.

Optionally, if VREG_NUM=2, a number-of-effective-elements index corresponding to an element range with the smallest sequence number is 0011, and with each addition of 1 to the sequence number of the element range, the number-of-effective-elements index is incremented by 0100.

Optionally, if VREG_NUM=1, a number-of-effective-elements index corresponding to an element range with the smallest sequence number is 0111, and with each addition of 1 to the sequence number of the element range, the number-of-effective-elements index is incremented by 1000.

Optionally, the instruction splitter splits the to-be-executed vector instruction into (VLEN·LMUL)/DPLEN microinstructions, VLEN is a bit width of a vector register, LMUL is a number of vector registers occupied by vectors in the to-be-executed vector instruction, and DPLEN is a processing bit width of the vector execution unit.

Optionally, the operand correlation judgment subunit determines, in the following manner, whether the execution of the first microinstruction is completed:

acquiring an operand in a microinstruction resulting from the splitting;

acquiring, from microinstructions resulting from previous splitting, a microinstruction that generates the operand; and determining whether execution of the acquired microinstruction is completed.

Optionally, the microinstruction transmission controller retains the microinstructions resulting from the splitting when the execution of the first microinstruction has not been completed or the number-of-effective-elements index is less than the first index.

Optionally, the vector execution unit includes a plurality of vector operation subunits, and the microinstruction transmission controller transmits the microinstructions resulting from the splitting to the plurality of vector operation subunits in parallel for execution.

According to an aspect of this disclosure, a vector execution unit is further provided, including:

a vector operation subunit adapted to execute a microinstruction acquired by splitting a to-be-executed vector instruction; and a first index recorder adapted to record a first index and transmit the first index in response to a request of an instruction transmitting unit, where the first index is a number-of-effective-elements index of a fault-only-first microinstruction whose processing has not been completed by the vector operation subunit According to an aspect of this disclosure, a processing unit is further provided, including:

an instruction fetching unit adapted to acquire a to-be-executed vector instruction;

an instruction decoding unit adapted to decode the to-be-executed vector instruction;

the foregoing instruction transmitting unit; and the foregoing vector execution unit.

According to an aspect of this disclosure, a computing device is further provided, including:

the foregoing processing unit; and a memory coupled to the processing unit and storing the to-be-executed vector instruction According to an aspect of this disclosure, a data center is further provided, including the foregoing computing device.

According to an aspect of this disclosure, a vector execution acceleration method is further provided, including:

splitting a to-be-executed vector instruction into microinstructions;

acquiring a number-of-effective-elements index of the microinstructions resulting from the splitting based on an element range involved in the microinstructions;

comparing the acquired number-of-effective-elements index with a first index, where the first index is a number-of-effective-elements index of a fault-only-first microinstruction whose processing has not been completed; and transmitting the microinstructions resulting from the splitting to a vector execution unit for execution when the number-of-effective-elements index is less than the first index.

Optionally, before the transmitting the microinstructions resulting from the splitting to a vector execution unit for execution, the method further includes: determining whether execution of a first microinstruction is completed, where operands in the microinstructions resulting from the splitting depend on the first microinstruction; and the transmitting the microinstructions resulting from the splitting to a vector execution unit for execution when the number-of-effective-elements index is less than the first index includes: transmitting the microinstructions resulting from the splitting to the vector execution unit for execution only when the execution of the first microinstruction is completed and the number-of-effective-elements index is less than the first index.

Optionally, the acquiring a number-of-effective-elements index of the microinstructions resulting from the splitting based on an element range involved in the microinstructions includes: calculating the number-of-effective-elements index according to the following formula:

$$vl\_index(i)=8\times(i+1)/VREG\_NUM-1, \text{ where}$$

vl_index(i) is the number-of-effective-elements index, VREG_NUM is a number of vector registers to which the to-be-executed vector instruction needs to write back, i is a sequence number of the element range, and i=0, 1, 2, ..., VLEN×VREG_NUM/DPLEN−1, where VLEN is a bit width of a vector register, and DPLEN is a processing bit width of the vector execution unit.

Optionally, if VREG_NUM=8, a number-of-effective-elements index corresponding to an element range with the smallest sequence number is 0000, and with each addition of 1 to the sequence number of the element range, the number-of-effective-elements index is incremented by 0001.

Optionally, if VREG_NUM=4, a number-of-effective-elements index corresponding to an element range with the smallest sequence number is 0001, and with each addition of 1 to the sequence number of the element range, the number-of-effective-elements index is incremented by 0010.

Optionally, if VREG_NUM=2, a number-of-effective-elements index corresponding to an element range with the smallest sequence number is 0011, and with each addition of 1 to the sequence number of the element range, the number-of-effective-elements index is incremented by 0100.

Optionally, if VREG_NUM=1, a number-of-effective-elements index corresponding to an element range with the smallest sequence number is 0111, and with each addition of 1 to the sequence number of the element range, the number-of-effective-elements index is incremented by 1000.

Optionally, the determining whether execution of a first microinstruction is completed includes:

acquiring an operand in a microinstruction resulting from the splitting;

acquiring, from microinstructions resulting from previous splitting, a microinstruction that generates the operands; and determining whether execution of the acquired microinstruction is completed.

Optionally, after the determining whether execution of a first microinstruction is completed, the method further includes: retaining the microinstructions resulting from the splitting when the execution of the first microinstruction has not been completed or the number-of-effective-elements index is less than the first index.

In the embodiments of this disclosure, the number-of-effective-elements index is tactfully coded and compared to determine, at low costs, whether a number-of-effective-elements index to which a vector instruction needs to refer in chaining is ready. In the embodiments of this disclosure, the number-of-effective-elements index of the microinstructions resulting from the splitting is acquired based on the element range involved in the microinstructions, and the acquired number-of-effective-elements index is compared with the first index, where the first index is a number-of-effective-elements index of a fault-only-first microinstruction whose processing has not been completed. If the number-of-effective-elements index is less than the first index, it indicates that the number-of-effective-elements index to which the to-be-executed vector instruction needs to refer is ready. In this way, execution can be performed without waiting until execution of a previous fault-only-first vector loading instruction is fully completed and an updated value of a number of effective elements is returned, thereby greatly improving operating efficiency of vector instructions following the fault-only-first vector loading instruction in chaining.

BRIEF DESCRIPTION OF DRAWINGS

Descriptions of the embodiments of the present invention with reference to the following accompanying drawings make the foregoing and other objectives, features, and advantages of the present invention clearer. In the accompanying drawings:

FIG. 9 shows a table of microinstruction execution timing in different clock cycles based on a dependency, of operands required for microinstructions acquired by splitting one instruction, on microinstructions acquired by splitting a previous instruction;

FIG. 12 shows a list of possible ranges of elements processed by microinstructions resulting from the splitting in case of different quantities of vector registers (VREG_NUM) to which a to-be-executed vector instruction needs to write back;

DESCRIPTION OF EMBODIMENTS

Figure 1:
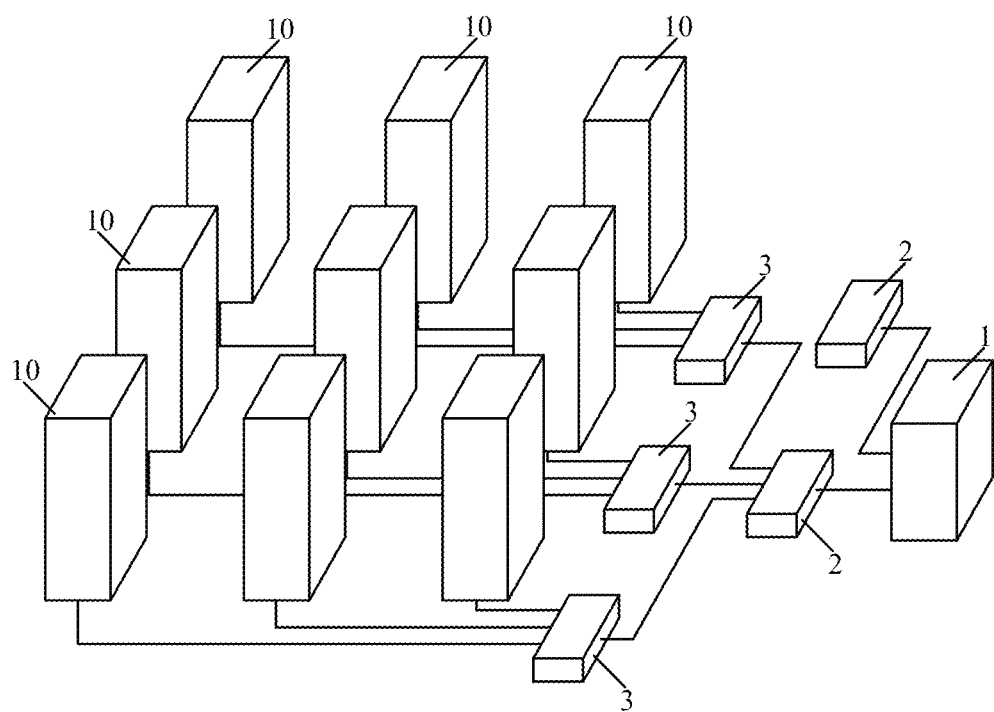
FIG. 1 is an architectural diagram of a data center to which an embodiment of this disclosure is applied.

The following describes the present invention based on embodiments, but the present invention is not limited to the embodiments. In the following detailed descriptions of the present invention, some specific details are described in detail. Those skilled in the art can fully understand the present invention without the descriptions of the details. To avoid obscuring the essence of the present invention, well-known methods, processes, and procedures are not described in detail. In addition, the accompanying drawings are not necessarily drawn to scale.

The following terms are used in this specification.

Free and open reduced instruction set architecture: namely, RISC-V instruction set architecture. It is a project initiated in Berkeley, a mecca of computers in the United States, and is a free and open-to-use reduced instruction set architecture. A reduced instruction set is different from a complex instruction set. x86 that dominates personal computers is an interface specification for complex instruction sets. The reduced instruction set has simplified some infrequently used instructions in the complex instruction set. An interface specification that dominates the embedded and mobile phone fields is an interface specification for reduced instruction sets. Certainly, the free and open reduced instruction set architecture is also an interface specification for reduced instruction sets. The greatest advantage of the free and open reduced instruction set architecture lies in that it is open and free. It is referred to as Linux of the hardware field. The project is jointly maintained by the community. No fee is charged for using this architecture, and there are no rigid use restrictions either. Currently, many large companies have joined the foundation of this architecture to get rid of control of industry giants. This architecture has late-mover advantages. Both ARM and x86 have been developing for many years, and forward compatibility needs to be considered in large-scale commercial use. However, the free and open reduced instruction set architecture has no historical burden, so that the instruction set is quite simple and performance is also superb.

Vector extension instruction sets are available of the free and open reduced instruction set architecture. In the information processing field, large quantities of operations of the same type often need to be performed. For example, to perform the same processing operation on several data items of a large quantity of users on the Internet, a large quantity of single-instructions are required for processing. To avoid overheads caused by processing of the single-instructions, a vector operation instruction emerges. A data item involved in a single operation is regarded as an element in a vector, and operation results for a batch of operation results are generated at a time through this vector operation. Based on this concept, several instructions for vector operations are extended for the free and open reduced instruction set architecture, and become the vector extension instruction set of the free and open reduced instruction set architecture. In the following terms, parameters such as a number of effective elements EN, SEW, LMUL, fault-only-first, and a number of effective elements are all derived from this instruction set.

Figure 4:
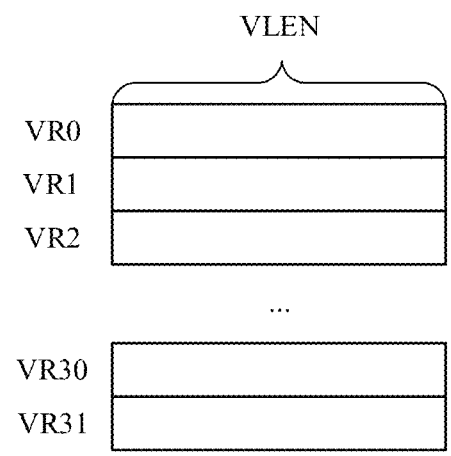
FIG. 4 is a schematic diagram of a bit width of a vector register (a number of effective elements EN)

Bit width of a vector register (VLEN): number of bits contained in a vector register. The vector register is a register that stores a vector in a vector operation when a vector execution unit in a processor executes the vector operation. VLEN is a hardware configuration parameter defined in the vector extension instruction set of the free and open reduced instruction set architecture. The vector extension instruction set of the free and open reduced instruction set architecture defines 32 vector registers: a VR0 to a VR31, as shown in FIG. 4. The number of bits in each register is represented by VLEN and needs to be a power of 2, for example, 64, 128, 256, 512, or 1024.

Figure 5:
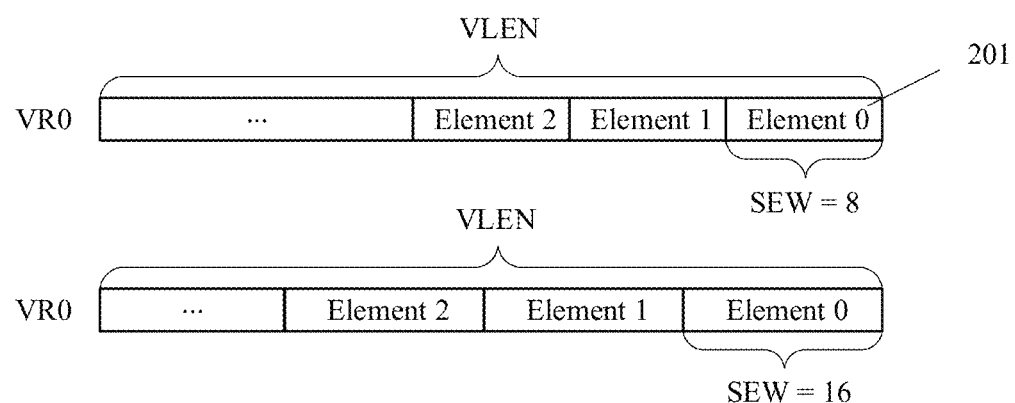
FIG. 5 shows two examples of a standard element bit width (SEW) of a vector.

Standard element bit width (SEW) of a vector: number of bits in a vector register that are occupied by an element 201 in a vector. The vector includes the element 201, and the vector is stored in one or more vector registers. One vector register usually stores more than one element 201. The number of bits occupied by each element 201 is SEW. SEW is a software configurable parameter defined in the vector extension instruction set of the free and open reduced instruction set architecture, and can support widths of 8, 16, 32, 64, and the like. FIG. 5 shows configuration manners when SEW=8 and SEW=16. When SEW=8, each element 201 occupies eight bits. If VLEN=128, the vector register can contain 128/8=16 elements 201. When SEW=16, each element 201 occupies 16 bits. If VLEN=128, the vector register can contain 128/16=8 elements 201.

Figure 6:
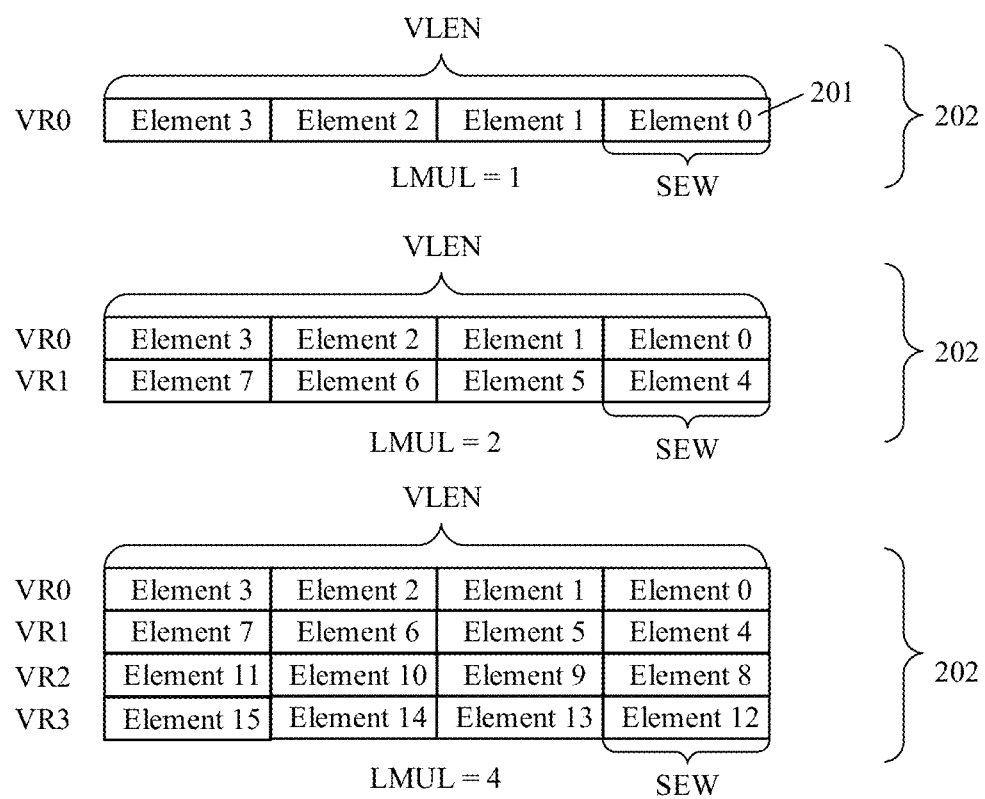
FIG. 6 shows three examples of a number of vector registers occupied by a vector (LMUL)

Number of vector registers occupied by a vector (LMUL): also referred to as a vector register group. It is the number of vector registers required for storing all elements in a vector. A vector includes elements, but the number of elements contained in each vector register is limited. Therefore, a plurality of vector registers may be required for expressing one vector. A number of vector registers required for expressing one vector is LMUL. LMUL is a software configurable parameter defined in the vector extension instruction set of the free and open reduced instruction set architecture. FIG. 6 shows cases in which LMUL is 1, 2, and 4, respectively. Each vector register can contain four elements. When a vector includes four elements, LMUL=1, that is, one vector register can express the vector. When a vector includes eight elements, LMUL=2, that is, two vector registers can express the vector. When a vector includes 16 elements, LMUL=4, that is, four vector registers can express the vector.

Figures 7A, 7B:
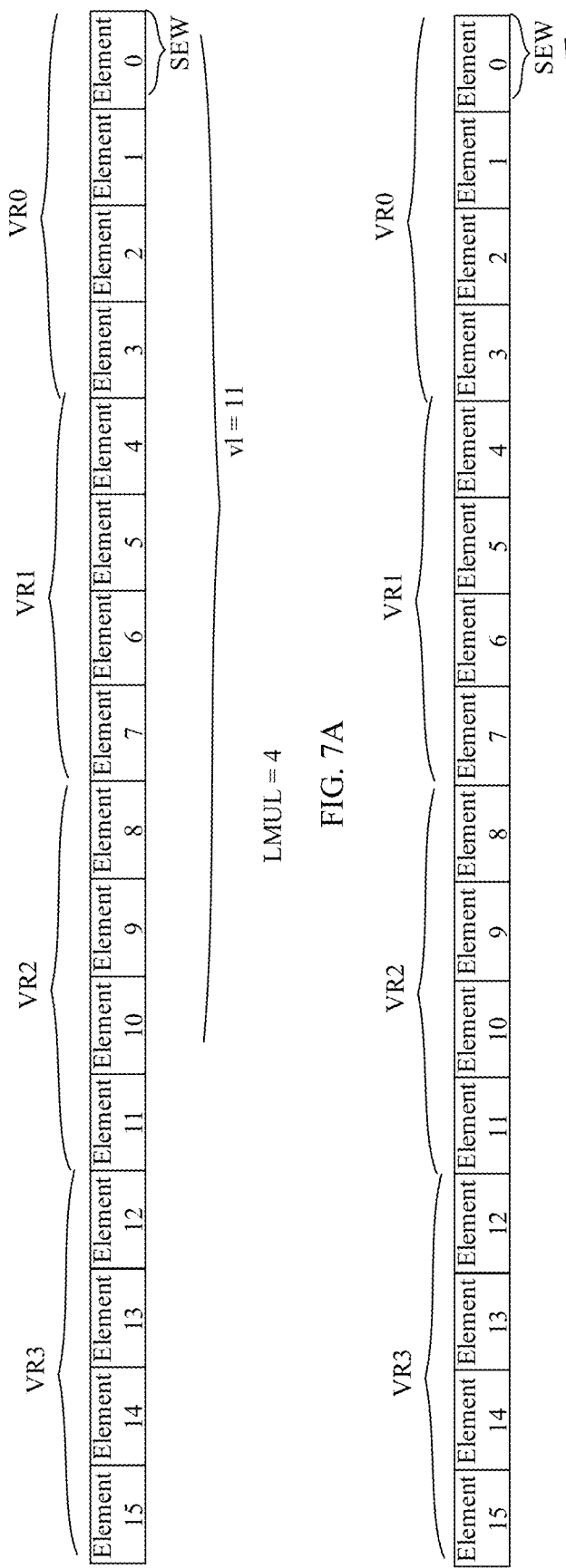
FIG. 7A and FIG. 7B show different examples of different quantities of effective elements (effective element quantities) processed by one instruction.

Number of effective elements: number of effective elements. It is a control register parameter in the vector extension instruction set of the free and open reduced instruction set architecture, and is used to indicate the number of effective elements that need to be processed and updated in one vector instruction. One vector instruction may not process or occupy all elements of an entire control register. An occupied element is referred to as an effective element, and an idle and unoccupied element is referred to as an ineffective element. As shown in FIG. 7A, when the number of effective elements=11, a vector instruction may process only 11 elements of elements 0 to 10, elements 12 to 15 are not processed, and the elements 12 to 15 are idle. As shown in FIG. 7B, when the number of effective elements=16, a vector instruction can process all elements 0 to 15 in a vector register. This parameter is of great significance, and subsequent vector instructions need to refer to this parameter for vector operations and writeback. Generally, when a vector instruction is executed, on the one hand, an execution result of a previous vector instruction may be required, and on the other hand, the number of effective elements needs to be determined based on the vector length, to perform an operation and writeback. The number of effective elements can be changed only by two control register writing instructions vsetvli/vsetvl and a fault-only-first vector loading instruction. The fault-only-first vector loading instruction is described in detail below.

vsetvli/vsetvl: instructions, in the vector extension instruction set of the free and open reduced instruction set architecture, are used to set the SEW, LMUL, and number of effective elements parameters. For example, when VLEN=128, LMUL=4, SEW=32, and the number of effective elements=11 are set. In this case, a VLEN× LMUL=128×4=512-bit vector register group including a VR0 to a VR3 may be regarded as being able to contain VLEN×LMUL/SEW=16 elements: an element 0 to an element 15 in ascending order, and a bit width of each element is 16 bits. However, positions of these 16 elements may not all be used to place elements. Effective elements (that is, element positions in which elements are placed) are specified by the number of effective elements. Because the number of effective elements=11, 11 elements with the smallest sequence numbers, namely, the element 0 to the element 10, are effective elements, that is, elements are placed in 11 element positions with the smallest sequence numbers, and remaining element positions are idle.

Vector loading instruction: an instruction for storing a vector in a vector register. During storing, each element of the vector occupies a SEW position, and the entire vector occupies LMUL vector registers. Elements are placed in bit positions with the smallest sequence numbers in the LMUL vector registers, where a number of the bit positions is equal to the number of effective elements, and no elements are placed in remaining positions.

Figure 8:
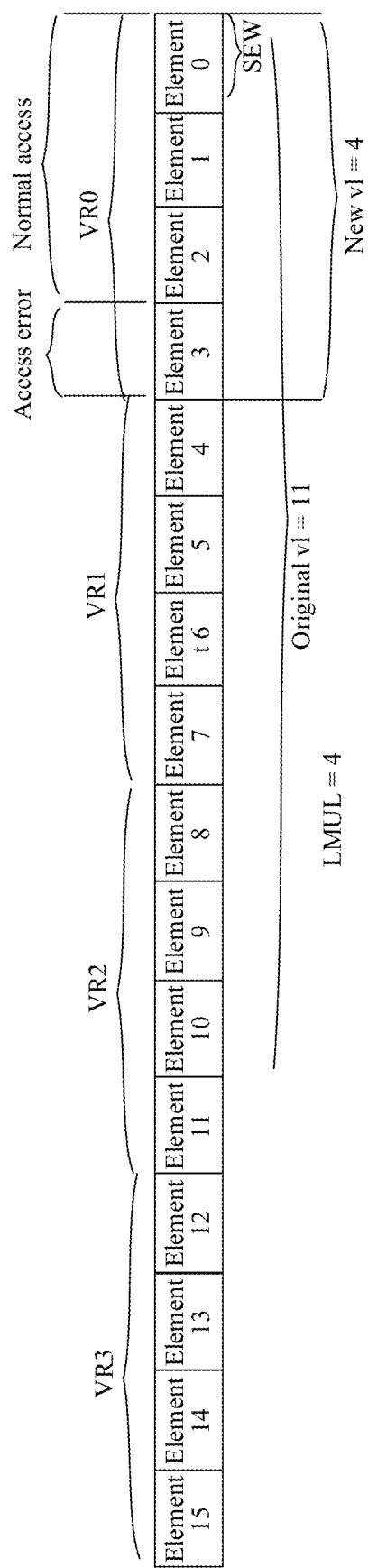
FIG. 8 shows a case in which a number of effective elements is changed after a fault-only-first instruction encounters an access error.
Figure 10:
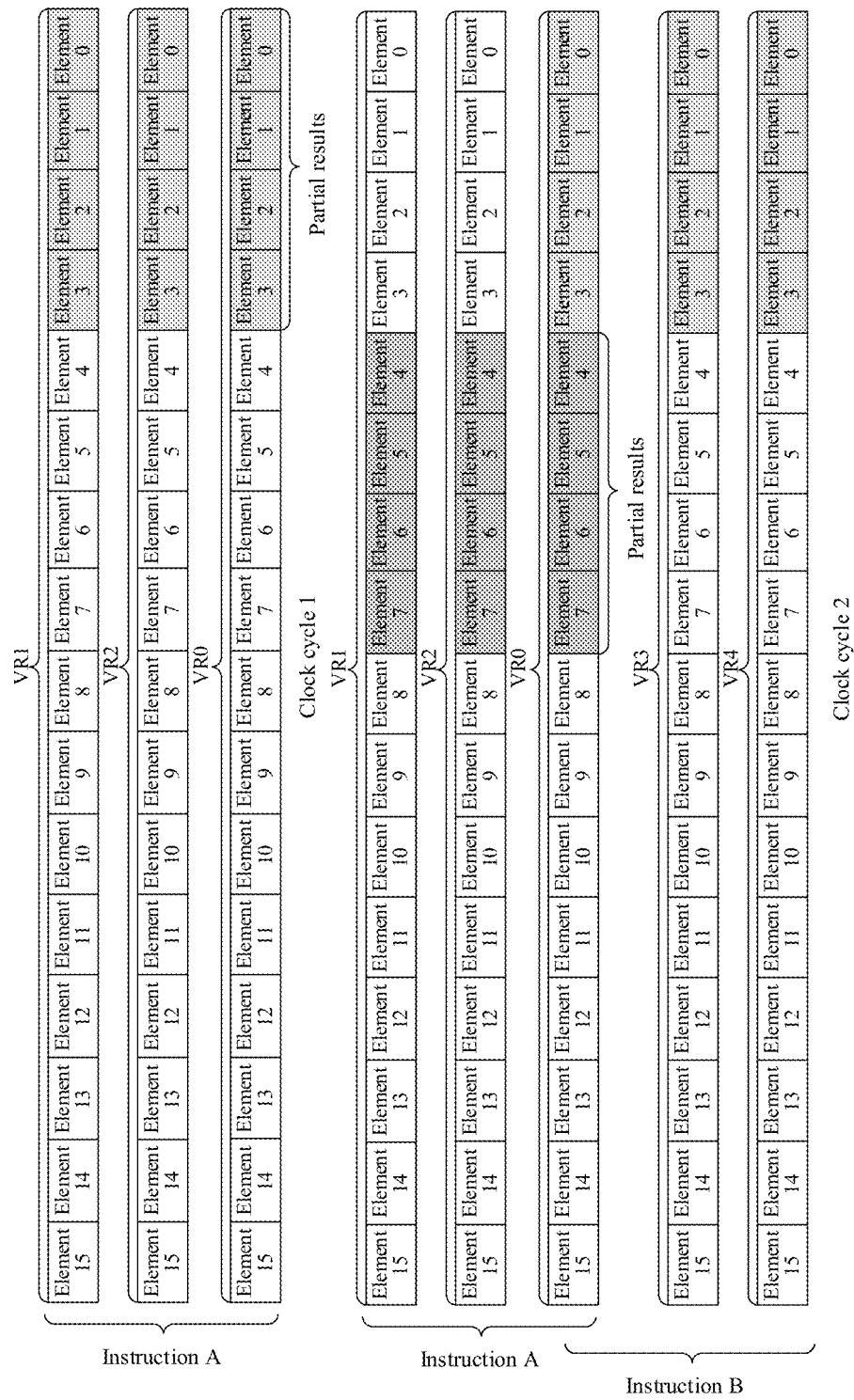
FIG. 10 shows an example of microinstructions, of two instructions, that are executed in different clock cycles in chaining.

Fault-only-first vector loading instruction: A difference between this type of instruction and a common vector loading instruction lies in that the common loading instruction responds to an exception when an access error occurs while any effective element is being loaded, but the fault-only-first vector loading instruction responds to an exception only when an access error occurs while the $0^{th}$ element (an element with the smallest sequence number) is being loaded, and if a non-$0^{th}$ element encounters an access error, only the number of effective elements is updated to a total number of elements processed without access errors. As shown in FIG. 8, when a vector including 11 elements is loaded, the vector originally should occupy positions of elements 0 to 10. During loading from the least significant bit to the most significant bit, no access error occurs during loading of the elements 0 to 3, but an access error occurs during loading of the element 4. In this case, the number of effective elements is updated to 4, indicating that effective elements are 0 to 3. The fault-only-first vector loading instruction is also the only instruction, in the vector extension instruction set of the free and open reduced instruction set architecture, that is capable of modifying the number of effective elements, except setvl/setvli.

Chaining (chaining): an acceleration mechanism for vector execution. In chaining, when a subsequent vector instruction needs to perform an operation by using a result written by a previous vector instruction into a vector register as an operand, execution is not performed after execution of the entire previous vector instruction is completed; instead, the instruction is split into a plurality of microinstructions, and an execution result of a microinstruction whose execution is completed is output to the subsequent instruction in advance. In this way, the subsequent instruction can run if it gets results of some of the microinstructions of the previous instruction, without waiting for an execution result of the entire previous instruction, thereby reducing a waiting time and improving vector operation efficiency. For example, a result produced by a vector instruction A is to be written into a vector register VRX, and a vector instruction B needs to use a value of the vector register VRX as an operand to perform operations. Under normal circumstances, the vector instruction B needs to wait until the vector instruction A is completed before the vector instruction B can get the result of the VRX as an operand to perform operations, that is, execution of the instruction B depends on the result of the instruction A, and there is a correlation between the instruction B and the instruction A. A vector includes elements, a vector operation is performed by using an element as a unit, and a vector operation result VRX also includes a plurality of elements. Therefore, in the case of a large number of elements and a limited execution capability of an operation unit, only some of the elements can be processed each time, and operation results of only some of the elements are produced each time. This part of results may be output, in advance for processing, to an operation unit in which the vector instruction B is located. If the operation results of this part of elements are sufficient for some operations acquired by splitting the vector instruction B, a waiting time of the vector instruction B can be reduced, thereby improving overall execution efficiency of vector operations.

Processing bit width of a vector execution unit (DPLEN): As described above, when a vector has a relatively large number of elements and an execution capability of the vector execution unit is limited, for a vector involved in an instruction, only some of elements of the vector can be processed each time, and operation results of only some of the elements of the vector are produced each time. A number of bits of this part of elements is DPLEN.

Microinstruction: As described above, because the vector execution unit can perform operations only on elements of DPLEN bits each time, a part, of an instruction, used for the operations on the elements of the DPLEN bits is separated from the instruction as a microinstruction.

Operand: The operand is an entity on which an operator in an instruction acts. The operand specifies an amount on which an operation in the instruction is to be performed. For example, a vector multiplication instruction vmul.vv vr4, vr0,vr3 means multiplying a vector vr0 and a vector vr3, and using a resulting vector as a new vector vr4. Herein, the vector vr4, the vector vr0, and the vector vr3 are all operands required for the vector multiplication instruction.

Figure 13:
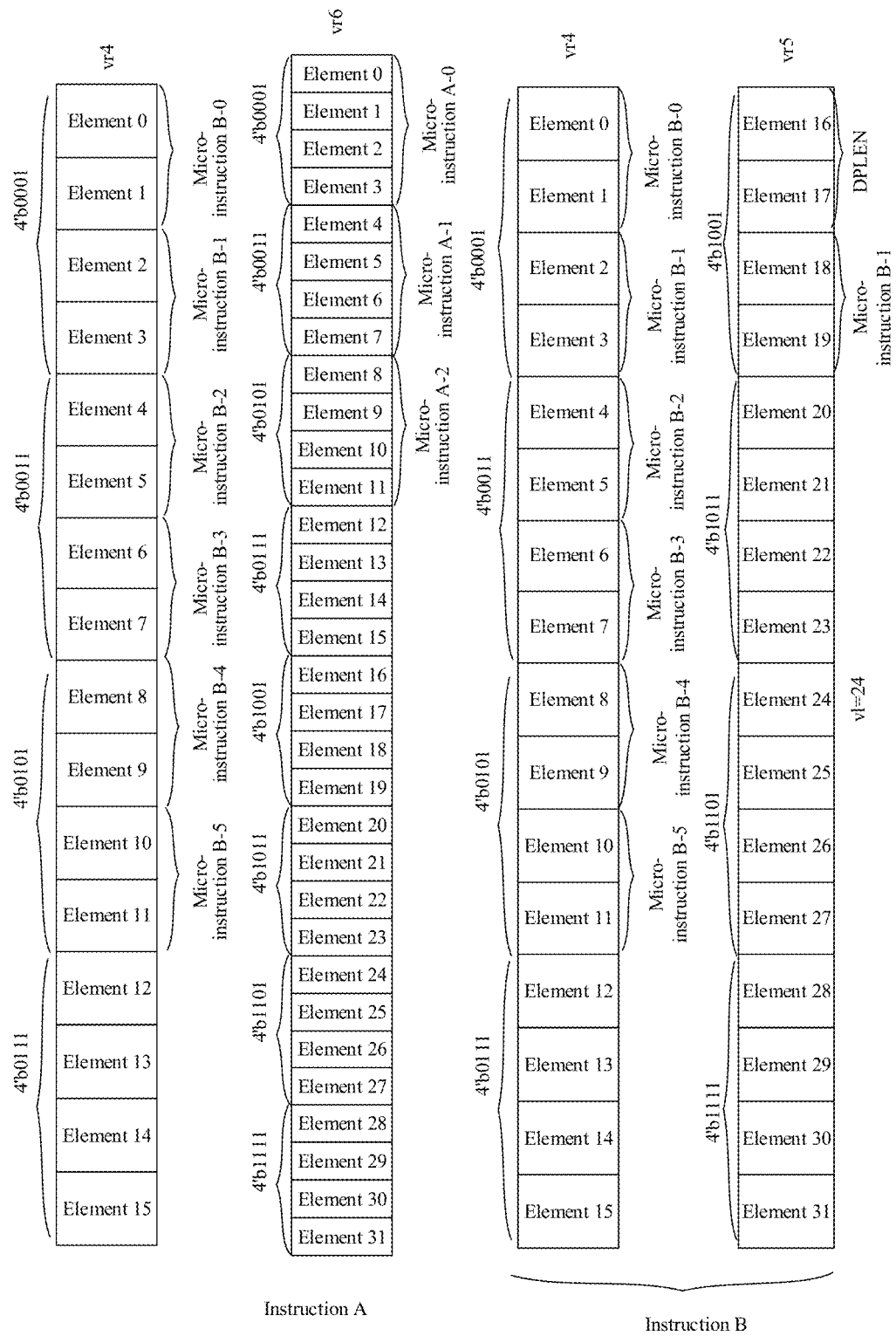
FIG. 13 shows an example of comparing number-of-effective-elements indexes of microinstructions acquired by splitting a vector instruction following a fault-only-first instruction with number-of-effective-elements indexes of microinstructions acquired by splitting the fault-only-first instruction.

Number-of-effective-elements index: The number-of-effective-elements index is not a number of effective elements, but is an index that is created for an element range involved in a microinstruction and that is used for comparison of the number of effective elements. For a common vector instruction, the index reflects a specific interval, of a vector register, that corresponds to an element range involved in microinstructions acquired by splitting the common vector instruction. For a fault-only-first vector loading instruction, the index reflects a specific interval, of a vector register, that corresponds to an element range involved in microinstructions acquired by splitting the fault-only-first vector loading instruction. As shown in FIG. 13, an instruction A is a fault-only-first vector loading instruction. An instruction B is a common instruction following the instruction A. For the instruction A, DPLEN is a bit width of four elements.

Assuming that a current microinstruction acquired by splitting the instruction A is a microinstruction A-2, according to the rules in the foregoing descriptions, a number-of-effective-elements index of the microinstruction is coded as 0101. Microinstructions that have been transmitted for execution are a microinstruction A-0 and a microinstruction A-1. A microinstruction B-0 and a microinstruction B-1 that are acquired by splitting the instruction B act on an element range of elements 0 to 3. Therefore, according to the rules in the foregoing descriptions, a number-of-effective-elements index of the microinstructions is coded as 0001. Because the coded number-of-effective-elements index is 0001, which is not less than an index 0001 of A-0 whose execution has not been completed, the microinstructions need to wait until the execution of A-0 is completed and update information of a number of effective elements is confirmed, and then may be transmitted. For microinstructions B-2 and B-3 that are acquired by splitting the instruction B, according to the rules in the foregoing descriptions, a number-of-effective-elements index of the microinstructions is coded as 0011. Because 0011 is not less than indexes 0001 and 0011 of A-0 and A-1, . . . , the microinstructions need to wait until execution of both A-0 and A-1 is completed and update information of a number of effective elements is confirmed, and then may be transmitted. A number-of-effective-elements index of microinstructions B-4 and B-5 that are acquired by splitting the instruction B is 0101. Because 0101 is not less than indexes 0001, 0011, and 0101 of A-0, A-1, and A-2, even if execution of A-0 and A-1 has been completed in a vector operation subunit 1213, A-0 and A-1 cannot be executed and transmitted in advance by skipping the microinstruction A-2, but need to wait until A-2 is also transmitted and executed.

Data Center

A data center is a globally coordinated specific device network used to transmit, accelerate, display, calculate, and store data information on Internet network infrastructure. In future development, the data center is also to become an asset for competition of enterprises. Because the data center needs to perform operations on a large amount of data at all times, a vector operation emerges accordingly. In the vector operation, a large amount of discrete data on which the same operation needs to be performed may be vectorized, and the discrete data is used to constitute a vector. An operation is performed on the vector instead of a single element, thereby improving operation efficiency for data on which the same operation needs to be performed.

In a conventional large-scale data center, a network structure is usually shown in FIG. 1, that is, a hierarchical inter-networking model. This model includes the following parts:

Servers 10: Each server 10 is a processing and storage entity of the data center, and processing and storage of a large amount of data in the data center are performed by the servers 10.

Access switches 3: The access switches 3 are switches used to enable the servers 10 to connect to the data center. One access switch 3 is connected to a plurality of servers 10. The access switches 3 are usually located at the top of a rack, and therefore are also referred to as top of rack (Top of Rack) switches. They are physically connected to the servers.

Aggregation switches 2: Each aggregation switch 2 is connected to a plurality of access switches 3, and also provides other services, such as a firewall, intrusion detection, and network analysis.

Core switch 1: The core switch 1 provides high-speed forwarding for packets entering and leaving the data center, and provides connectivity for the aggregation switches 2. A network of the entire data center is divided into an L3 routing network and an L2 routing network. The core switch 1 usually provides a flexible L3 routing network for the network of the entire data center.

Usually, the aggregation switches 2 are demarcation points between the L2 and L3 routing networks. The L2 network is below the aggregation switches 2, and the L3 network is above the aggregation switches 2. Each group of aggregation switches manages a point of delivery (POD, Point Of Delivery), and there is an independent VLAN network within each POD. An IP address and a default gateway do not need to be modified when a server is migrated within a POD, because a POD corresponds to an L2 broadcast domain.

The spanning tree protocol (STP, Spanning Tree Protocol) is usually used between the aggregation switches 2 and the access switches 3. The STP makes only one aggregation switch 2 available for one VLAN network, and other aggregation switches 2 are used only when the aggregation switch 2 is faulty. In other words, horizontal expansion is not possible for the aggregation switches 2, because even if a plurality of aggregation switches 2 are added, only one of them is working.

Server

Figure 2:
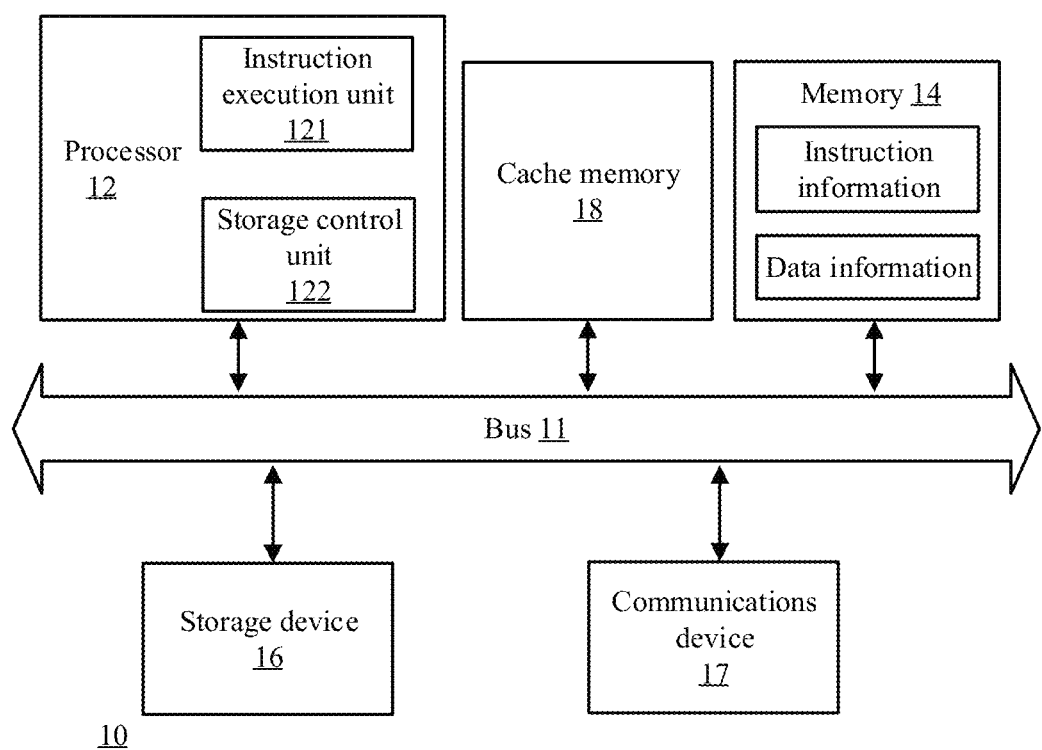
FIG. 2 is a schematic block diagram of a server in FIG. 1 according to an embodiment of this disclosure.

FIG. 2 is a schematic block diagram of a server 10 in FIG. 1. The server 10 is an example of a "central" system architecture. The server 10 may be constructed based on various models of processors currently on the market, and is driven by an operating system such as a WINDOWS™ operating system version, a UNIX operating system, or a Linux operating system. In addition, the server 10 may be implemented in hardware and/or software such as a PC, a desktop computer, a notebook computer, a server, and a mobile communications apparatus.

As shown in FIG. 2, the server 10 in this embodiment of the present invention may include one or more processors 12 and a memory 14.

The memory 14 in the server 10 may be a main memory (referred to as a main memory or a memory for short), and is adapted to store instruction information and/or data information represented by a data signal, for example, store data (for example, an operation result) provided by the processor 12, and may also be adapted to implement data exchange between the processor 12 and an external storage device 16 (or referred to as an auxiliary memory or an external memory).

In some cases, the processor 12 may need to access the memory 14 to acquire data in the memory 14 or modify data in the memory 14. A speed of accessing the memory 14 is relatively low. Therefore, to alleviate a speed difference between the processor 12 and the memory 14, the server 10 further includes a cache memory 18 coupled to a bus 11. The cache memory 18 is adapted to cache some data such as program data or packet data, in the memory 14, that may be repeatedly invoked. The cache memory 18 is implemented, for example, by a type of storage apparatus such as a static random access memory (Static Random Access Memory, SRAM for short). The cache memory 18 may be in a multi-level structure, for example, a three-level cache structure including a level 1 cache (L1 Cache), a level 2 cache (L2 Cache), and a level 3 cache (L3 Cache), or a cache structure with more than three levels, or another type of cache structure. In some embodiments, a part of the cache memory 18 (for example, the level 1 cache, or the level 1 cache and the level 2 cache) may be integrated in the processor 12 or integrated with the processor 12 in the same system-on-a-chip.

Based on this, the processor 12 may include an instruction execution unit 121, a storage control unit 122, and other parts. The instruction execution unit 121 initiates a write access request when executing some instructions that need to modify the memory. The write access request specifies written data that needs to be written into the memory and a corresponding physical address. The storage control unit 122 is adapted to control whether to store the written data to a storage position indicated by the physical address to which the write access request is mapped. To be specific, when specific conditions are met, the written data is allowed to be stored to the storage position indicated by the physical address to which the write access request is mapped; otherwise, the written data is not allowed to be stored to the storage position indicated by the physical address to which the write access request is mapped.

In addition, the server 10 may further include a storage device 16 and a communications device 17. The storage device 16 is, for example, a device that is used for information access, such as a hard disk, an optical disk, or a flash memory, and that is coupled to the bus 11 through a corresponding interface. The communications device 17 is adapted to communicate with other servers and the access switch 3 in FIG. 1 in various manners. The communications device 17 may include, for example, one or more communications modules. In an example, the communications device 17 may include a wireless communications module suitable for a specific wireless communication protocol. For example, the communications device 17 may include a WLAN module adapted to implement Wi-Fi™ communication in compliance with the 802.11 standard formulated by the Institute of Electrical and Electronics Engineers (IEEE). The communications device 17 may also include a WWAN module adapted to implement wireless wide area communication in compliance with a cellular protocol or other wireless wide area protocols. The communications device 17 may further include other communications modules using other protocols, such as a Bluetooth module, or other communications modules of user-defined types. Alternatively, the communications device 17 may be a port used for serial transmission of data.

Certainly, structures of different servers 10 may vary based on differences in main boards, operating systems, and instruction set architectures. For example, currently, many servers 10 are provided with an input/output control center connected between the bus 11 and various input/output devices, and the input/output control center may be integrated in the processor 12 or independent of the processor 12.

Processor

Figure 3:
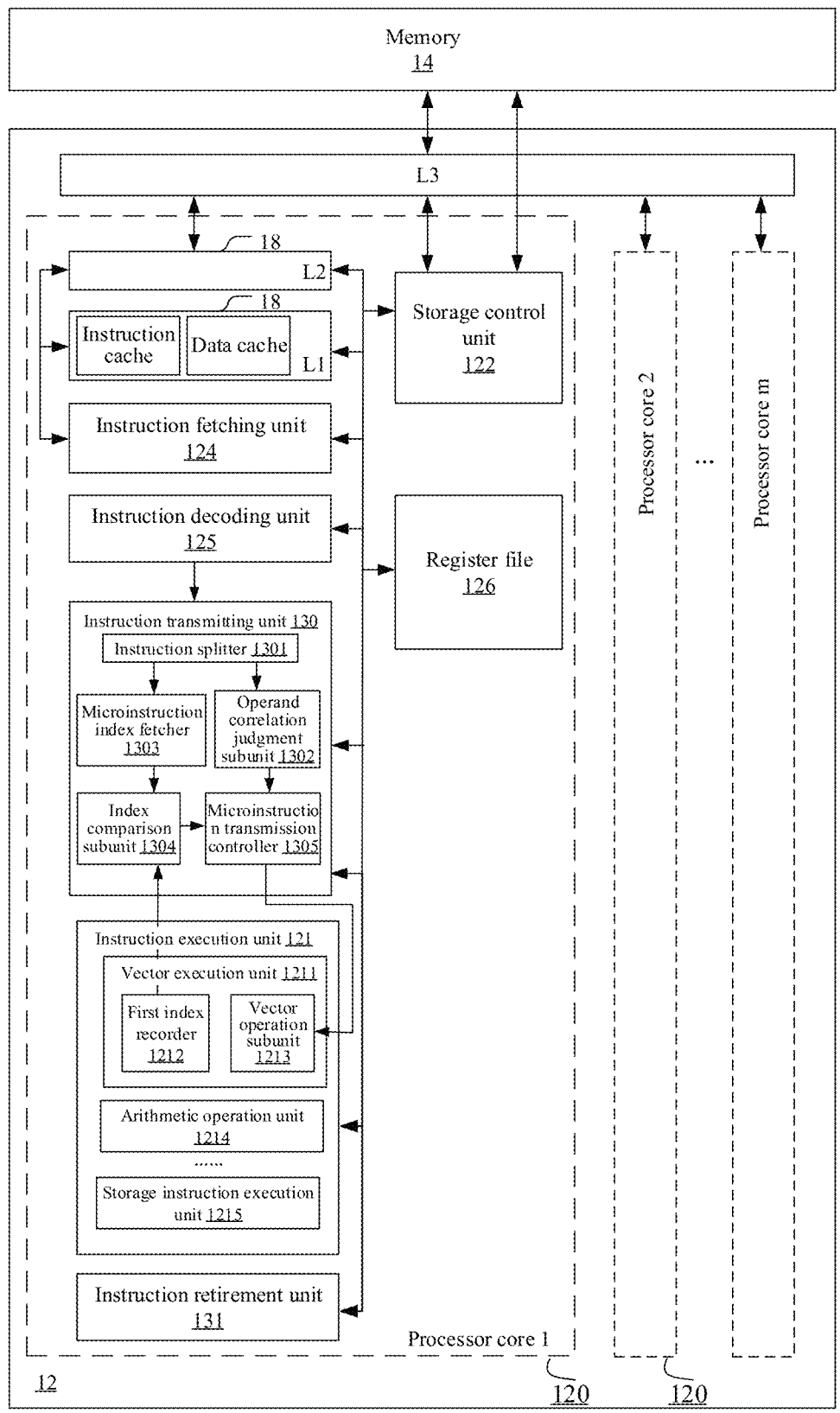
FIG. 3 is a schematic block diagram of a processor in FIG. 2 according to an embodiment of this disclosure.

FIG. 3 is a schematic block diagram of a processor 12 according to an embodiment of the present invention.

In some embodiments, each processor 12 may include one or more processor cores 120 adapted to process instructions. Processing and execution of the instructions may be controlled by a user (for example, by using an application program) and/or a system platform. In some embodiments, each processor core 120 may be adapted to process a specific instruction set. In some embodiments, the instruction set may support complex instruction set computing (Complex Instruction Set Computing, CISC), reduced instruction set computing (Reduced Instruction Set Computing, RISC), or computing based on a very long instruction word (Very Long Instruction Word, VLIW). Different processor cores 120 may process different instruction sets or the same instruction set. In some embodiments, the processor core 120 may further include other processing modules, such as a digital signal processor (Digital Signal Processor, DSP). In an example, FIG. 3 shows processor cores 1 to m, where m is a non-zero natural number.

In some embodiments, the cache memory 18 shown in FIG. 2 may be fully or partially integrated in the processor 12. In addition, based on different architectures, the cache memory 18 may be a single or multi-level internal cache memory (for example, a three-level cache memory including L1 to L3 shown in FIG. 3, which are uniformly identified as 18 in FIG. 3) located inside and/or outside each processor core 120, and may also include an instruction-oriented instruction cache and a data-oriented data cache. In some embodiments, various components in the processor 12 may share at least a part of the cache memory. As shown in FIG. 3, the processor cores 1 to m share, for example, the level 3 cache memory L3. The processor 12 may further include an external cache (not shown), and other cache structures may also serve as external caches of the processor 12.

In some embodiments, as shown in FIG. 3, the processor 12 may include a register file 126 (Register File). The register file 126 may include a plurality of registers adapted to store different types of data and/or instructions. These registers may be of different types. For example, the register file 126 may include an integer register, a vector register, a floating point register, an instruction register, and a pointer register. The registers in the register file 126 may be implemented by general-purpose registers, or a specific design may be used according to an actual requirement of the processor 12.

The processor 12 is adapted to execute an instruction sequence (namely, a program). A process of executing each instruction by the processor 12 includes: fetching the instruction from a memory that stores the instruction, decoding the fetched instruction, executing a decoded instruction, storing an instruction execution result, and other steps. The process is repeated until all instructions in the instruction sequence are executed or a stop instruction appears.

To implement the foregoing process, the processor 12 may include an instruction fetching unit 124, an instruction decoding unit 125, an instruction transmitting unit 130, an instruction execution unit 121, an instruction retirement unit 131, and the like.

The instruction fetching unit 124 serves as a startup engine of the processor 12, and is adapted to transfer instructions from the memory 14 to an instruction register (which may be a register adapted to store instructions in the register file 126 shown in FIG. 3), and receive a next instruction fetching address or calculate a next instruction fetching address based on an instruction fetching algorithm. For example, the instruction fetching algorithm includes: incrementing or decrementing an address based on an instruction length.

After fetching an instruction, the processor 12 enters an instruction decoding stage. The instruction decoding unit 125 decodes the fetched instruction based on a predetermined instruction format to acquire operand acquisition information required for the fetched instruction, to prepare for an operation to be performed by the instruction execution unit 121. The operand acquisition information indicates, for example, an immediate, a register, or other software/hardware capable of providing a source operand.

The instruction transmitting unit 130 usually exists in a high-performance processor 12, and is located between the instruction decoding unit 125 and the instruction execution unit 121, and adapted to schedule and control instructions to efficiently allocate the instructions to different instruction execution units 121, so that parallel operations of a plurality of instructions are possible. After an instruction is fetched, decoded, and scheduled to a corresponding instruction execution unit 121, the corresponding instruction execution unit 121 starts to execute the instruction, that is, performs an operation indicated by the instruction and implements a corresponding function. The embodiments of this disclosure are mainly performed in the instruction transmitting unit 130 and the instruction execution unit 121. The following describes specific structures of the instruction transmitting unit 130 and the instruction execution unit 121 in detail with reference to the embodiments of this disclosure.

The instruction execution unit 121 includes a vector execution unit 1211, an arithmetic operation unit 1214, and a storage instruction execution unit 1215 adapted to process different types of instructions. The arithmetic operation unit (ALU) 1214 is an arithmetic unit for performing integer operations and logical operations. The vector execution unit 1211 is an arithmetic unit for performing vector operations. When executing a specific type of instruction (for example, a memory access instruction), the instruction execution unit 121 needs to access the memory 14 to acquire information stored in the memory 14 or provide data that needs to be written into the memory 14. This execution unit for executing the memory access instruction is referred to as the storage instruction execution unit 1215. Although FIG. 3 shows only the foregoing instruction execution units as examples, those skilled in the art should understand that any instruction execution unit for performing a function that needs to be performed may be further included as required.

The instruction retirement unit 131 is mainly responsible for writing an execution result generated by the instruction execution unit 121 back to a corresponding storage position (for example, a register inside the processor 12), so that subsequent instructions can quickly acquire the corresponding execution result from the storage position.

In the processor 12, all instruction execution units 121 may run in parallel and output corresponding execution results.

After the memory access instruction is acquired by the instruction fetching unit 124, the instruction decoding unit 125 may decode the memory access instruction, so that a source operand of the memory access instruction can be acquired. A decoded memory access instruction is provided to a corresponding instruction execution unit 121. The instruction execution unit 121 may perform a corresponding operation on the source operand of the memory access instruction (for example, the arithmetic logic unit performs an operation on the source operand stored in a register) to acquire address information corresponding to the memory access instruction, and initiate a corresponding request such as an address translation request or a write access request based on the address information.

The source operand of the memory access instruction usually includes an address operand. The storage control unit 122 performs an operation on the address operand to acquire a virtual address or a physical address corresponding to the memory access instruction. The virtual address may be converted into the physical address. With the storage control unit 122, the cache memory 18 and/or the memory 14 may be accessed based on a translated physical address.

Based on different functions, the memory access instruction may include a load instruction and a store instruction. During an execution process of the load instruction, information in the memory 14 or the cache memory 18 usually does not need to be modified. The instruction execution unit 121 only needs to read, based on an address operand of the load instruction, data stored in the memory 14, the cache memory 18, or an external storage device.

Different from that of the load instruction, a source operand of the storage instruction includes not only an address operand, but also data information. During an execution process of the storage instruction, the memory 14 and/or the cache memory 18 usually need/needs to be modified. The data information of the storage instruction may indicate written data. A source of the written data may be an execution result of an instruction such as an operation instruction or a load instruction, or may be data provided by a register in the processor 12 or another storage unit, or may be an immediate.

Detailed Structures of the Instruction Transmitting Unit 130 and the Vector Execution Unit 1211 in the Embodiments of This Disclosure, and Implementation Processes in the Embodiments of This Disclosure In chaining, when a subsequent vector instruction needs to perform an operation by using a result written by a previous vector instruction into a vector register as an operand, execution is not performed after execution of the entire previous vector instruction is completed; instead, the instruction is split into a plurality of microinstructions, and an execution result of a microinstruction whose execution is completed is output to the subsequent instruction in advance. In this way, the subsequent instruction can run if it gets results of some of the microinstructions of the previous instruction. This improves vector operation efficiency compared with a solution of waiting for an execution result of the entire previous instruction. However, chaining is likely to cause problems to a number of effective elements (number of effective elements) in a vector extension instruction set of a free and open reduced instruction set architecture.

The free and open reduced instruction set architecture is a project initiated in Berkeley, a mecca of computers in the United States. The greatest advantage of the free and open reduced instruction set architecture lies in that it is open and free. This architecture has late-mover advantages. Both ARM and x86 have been developing for many years, and forward compatibility needs to be considered in large-scale commercial use. However, the free and open reduced instruction set architecture has no historical burden, so that the instruction set is quite simple and performance is also superb. In the information processing field, large quantities of operations of the same type often need to be performed. For example, to perform the same processing operation on several data items of a large quantity of users on the Internet, a large quantity of single-instructions are required for processing. To avoid overheads caused by processing of the single-instructions, a vector operation instruction emerges. A data item involved in a single operation is regarded as an element in a vector, and operation results for a batch of operation results are generated at a time through this vector operation. Based on this concept, several instructions for vector operations are extended for the free and open reduced instruction set architecture, and become the vector extension instruction set of the free and open reduced instruction set architecture. The number of effective elements comes from the vector extension instruction set of the free and open reduced instruction set architecture, and is a control register parameter therein, and is used to indicate a number of elements that need to be processed and updated in one vector instruction. One vector instruction may not process or occupy all elements of an entire control register. An occupied element is referred to as an effective element. Generally, when a vector instruction is executed, on the one hand, an execution result of a previous vector instruction may be required, and on the other hand, an operation and writeback need to be performed with reference to the number of effective elements. A difference between a fault-only-first instruction and a common vector loading instruction lies in that the common loading instruction responds to an exception when an access error occurs while any effective element is being loaded, but the fault-only-first instruction responds to an exception only when an access error occurs while the 0th element (an element with the smallest sequence number) is being loaded, and if a non-0th element encounters an access error, only the number of effective elements is updated to a total number of elements processed without access errors. The fault-only-first instruction is the only instruction, in the vector extension instruction set of the free and open reduced instruction set architecture, that is capable of modifying the number of effective elements, except the setvl/setvli instruction specially used for setting the number of effective elements. Usually, a vector instruction only needs to determine the number of effective elements based on the setvl/setvli instruction. This parameter setting instruction is simple to execute and has a relatively short delay, and therefore causes no performance bottleneck. However, as an instruction that may change the number of effective elements, the fault-only-first vector loading instruction has an uncertain execution delay. A subsequent vector instruction needs to wait for the fault-only-first vector loading instruction to return whether the number of effective elements is updated before the subsequent vector instruction can be executed correctly. The waiting greatly degrades effects of chaining.

The embodiments of this disclosure are produced to cope with a problem that operating efficiency of subsequent vector instructions is low when a fault-only-first vector loading instruction is involved in chaining, and are mainly implemented by the instruction transmitting unit 130 and the vector execution unit 1211. The following describes in detail an internal structure of the instruction transmitting unit 130 and implementation processes in the embodiments of this disclosure As shown in FIG. 3, the instruction transmitting unit 130 in the embodiments of this disclosure includes an instruction splitter 1301, a microinstruction index fetcher 1303, an index comparison subunit 1304, and a microinstruction transmission controller 1305.

As described above, the instruction fetching unit 124 transfers an instruction from the memory 14 to an instruction register adapted to store instructions in the register file 26. Then the process proceeds to an instruction decoding stage. The instruction decoding unit 125 decodes the fetched instruction based on a predetermined instruction format to acquire operand acquisition information required for the fetched instruction, to prepare for an operation to be performed by the instruction execution unit 121. If it is found through decoding that the instruction is a vector operation instruction, that is, a to-be-executed vector instruction, the to-be-executed vector instruction is transmitted to the instruction transmitting unit 130 for transmitting the instruction to the instruction execution unit 121.

After the to-be-executed vector instruction enters the instruction transmitting unit 130, the instruction splitter 1301 splits the to-be-executed vector instruction into microinstructions. As described above, when a vector has a relatively large number of elements and an execution capability of the vector execution unit 1211 is limited, for a vector involved in an instruction, only some of elements of the vector can be processed each time (one or more clock cycles), and operation results of only some of the elements of the vector are produced each time. A number of bits of this part of elements is DPLEN. Therefore, a part, of the instruction, used for operations on the elements of the DPLEN bits is separated from the instruction as a microinstruction.

During splitting, the instruction splitter 1301 may split the to-be-executed vector instruction into (VLEN·LMUL)/DPLEN microinstructions. As described above, VLEN is a bit width of a vector register, LMUL is a number of vector registers occupied by vectors in the to-be-executed vector instruction, and DPLEN is a processing bit width of the vector execution unit. When the to-be-executed vector instruction is split into (VLEN·LMUL)/DPLEN microinstructions, DPLEN bits may be fetched from the bit width of VLEN·LMUL in ascending order of bits as a microinstruction. In this way, a total of (VLEN·LMUL)/DPLEN microinstructions are formed. For example, when VLEN=128 and LMUL=8, the vector instruction needs to process a width of VLEN×LMUL=128×8=1024. However, for cost and utilization considerations, the processing bit width DPLEN of the vector execution unit 1211 may be only 64. In this case, the to-be-executed vector instruction needs to be split into VLEN×LMUL/DPLEN=1024/64=16 microinstructions for step-by-step execution and writeback. The instruction splitter 1301 each time fetches 64 bits from the 1024 bits of the to-be-executed vector instruction in ascending order of bits according to the foregoing principle, for subsequent processing.

The microinstruction index fetcher 1303 acquires a number-of-effective-elements index of the microinstructions resulting from the splitting based on an element range involved in the microinstructions.

Number of effective elements indicates a number of elements that need to be processed and updated in one vector instruction. One vector instruction may not process or occupy all elements of an entire control register. A processed and occupied element is referred to as an effective element. For example, if the control register can contain 16 elements but the number of effective elements=11, it indicates that the vector instruction processes only 11 elements of elements 0 to 10, and elements 12 to 15 are idle.

The number-of-effective-elements index is not a number of effective elements, but is an index that is created for a range of elements processed in a microinstruction and that is used for comparison of the number of effective elements. The number-of-effective-elements index is not specific to an element but to an element range. For a common vector instruction, the index reflects a specific interval, of a vector register, that corresponds to a range of elements processed in microinstructions acquired by splitting the common vector instruction. For a fault-only-first vector loading instruction, the index reflects an element range of a number of effective elements that is specified after microinstructions acquired by splitting the fault-only-first vector loading instruction are executed.

The fault-only-first vector loading instruction needs to be split into several microinstructions for execution. This means that a range of elements processed and written back by each microinstruction is related to DPLEN in splitting. To be specific, the 1st microinstruction resulting from the splitting writes back the least significant bits of a DPLEN bit width, and the 2nd microinstruction resulting from the splitting writes back the second least significant bits of a DPLEN bit width. Correspondingly, if a fault-only-first microinstruction resulting from the splitting needs to update a number of effective elements due to a writeback failure, an updated element range is definitely an element index range corresponding to DPLEN data that the microinstruction currently writes back.

Figure 11:
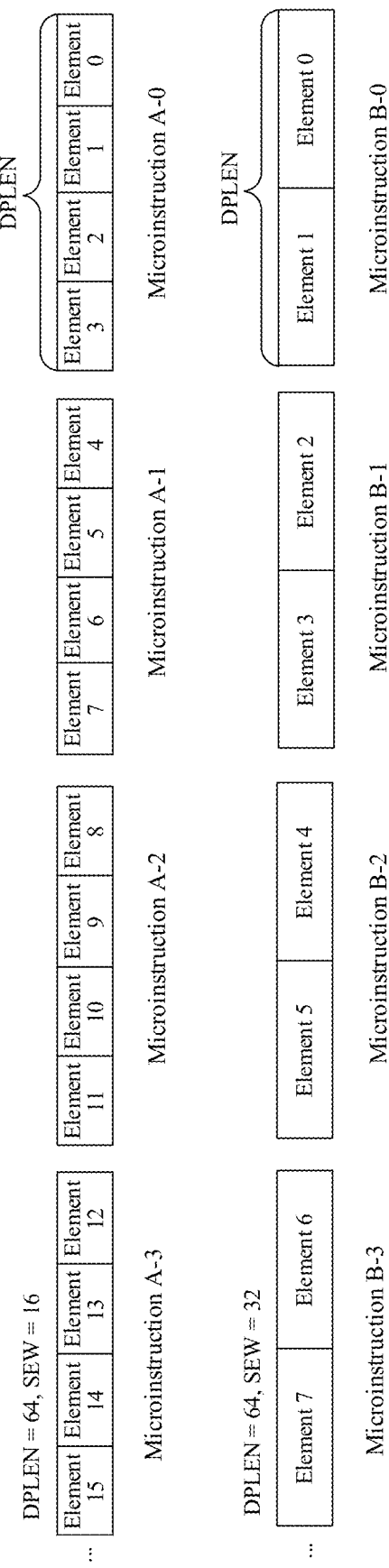
FIG. 11 shows two examples of an element range of elements for which a number of effective elements is changed when a fault-only-first instruction encounters an access error.

As shown in FIG. 11, it is assumed that DPLEN is a bit width of four elements, DPLEN=64, and SEW=16. An access error occurs during writeback by a microinstruction A-2 resulting from the splitting. The error element is definitely among an element 8 to an element 11. It is assumed that an access error occurs when the element 10 is written back. However, it does not matter which one of the elements 8 to 11 encounters an access error. An element range of all the elements is the elements 8 to 11, and the same element range corresponds to the same number-of-effective-elements index. Similarly, it is assumed that DPLEN is a bit width of two elements, DPLEN=64, and SEW=32. An access error occurs during writeback by a microinstruction B-2 resulting from the splitting. The error element is definitely an element 4 or an element 5. It is assumed that an access error occurs when the element 5 is written back. However, it does not matter which one of the elements 4 and 5 encounters an access error. An element range of both elements is the elements 4 and 5, and the same element range corresponds to the same number-of-effective-elements index.

An update on a number-of-effective-elements index performed by a microinstruction acquired by splitting the foregoing fault-only-first vector loading instruction may be determined based on SEW, LMUL, and DPLEN. Therefore, some microinstructions of other common vector instructions may also be transmitted in advance according to this feature, without waiting until the fault-only-first vector loading instruction is fully executed. Provided that bits of an element range involved in a microinstruction acquired by splitting a subsequent common vector instruction are less significant than those of an element range, in the fault-only-first vector loading instruction, in which it is confirmed that a number of effective elements is not to be updated, a result of a microinstruction corresponding to the element range, in the fault-only-first vector loading instruction, in which it is confirmed that the number of effective elements is not to be updated may be used to process the microinstruction acquired by splitting the subsequent common vector instruction. For example, when a microinstruction A-0 acquired by splitting the fault-only-first vector loading instruction has returned information confirming that a number of effective elements is not to be updated, it indicates that the number of effective elements is not likely to be updated to any value of elements 0 to 3. In this case, a microinstruction that processes only the elements 0 to 3 in a subsequent instruction may be transmitted for execution, and a current number of effective elements may be directly acquired from the control register. Similarly, if an instruction A-1 resulting from the splitting has returned information confirming that a number of effective elements is not to be updated, a microinstruction that processes only elements 4 to 7 in a subsequent instruction may be transmitted for execution. In this way, parallelism of instruction execution is improved.

As described above, when it is determined whether the microinstruction acquired by splitting the subsequent common vector instruction can be transmitted for parallel execution, it is considered whether the bits of the range of elements processed by the microinstruction are less significant than those of the element range (instead of an element), in the fault-only-first vector loading instruction, in which it is confirmed that the number of effective elements is not to be updated. Therefore, considering the number of effective elements alone makes no sense. Instead, a number-of-effective-elements index is used, which indicates an element range. Number-of-effective-elements indexes of all elements in the element range are the same. In this way, a number-of-effective-elements index of the range of elements processed by the microinstruction acquired by splitting the subsequent common vector instruction may be compared with the first index (that is, a number-of-effective-elements index of a microinstruction that is acquired by splitting the fault-only-first vector loading instruction and whose processing has not been completed) to determine whether the microinstruction acquired by splitting the subsequent common vector instruction can be transmitted for parallel execution.

In view of this, in the embodiments of this disclosure, a number-of-effective-elements index coding mechanism is designed to identify element ranges involved in current microinstructions resulting from the splitting (including microinstructions acquired by splitting a common vector instruction and a fault-only-first vector loading instruction), and compare a number-of-effective-elements index acquired based on an element range involved in a current microinstruction acquired by splitting the common vector instruction with the first index (a number-of-effective-elements index of a microinstruction acquired by splitting the fault-only-first vector loading instruction). The microinstruction acquired by splitting the common vector instruction can be transmitted for execution only when it is confirmed that the number-of-effective-elements index of the microinstruction is less than the first index; otherwise, the microinstruction acquired by splitting the common vector instruction needs to wait until the corresponding microinstruction acquired by splitting the fault-only-first vector loading instruction confirms an update status of a number of effective elements, and then can be transmitted.

In the vector extension instruction set of the free and open reduced instruction set architecture, LMUL may be set to a maximum of 8, that is, one vector instruction needs to process and write back to a maximum of eight vector registers. In this way, a total number of number-of-effective-elements indexes that can be set is as follows: INDEX_NUM=VLEN×8/DPLEN. If the number-of-effective-elements indexes are expressed in binary, at least INDEX_LEN=log 2(INDEX_NUM) is required to express the number-of-effective-elements indexes. VLEN×8/DPLEN is merely a maximum number of number-of-effective-elements indexes that can be set. Actually, a vector instruction usually does not need to write back to all the eight vector registers. If writeback is performed on four vector registers, only VLEN×4/DPLEN number-of-effective-elements indexes are required. If writeback is performed on two vector registers, only VLEN×2/DPLEN number-of-effective-elements indexes are required. To sum up, if it is assumed that VREG_NUM is a number of vector registers to which the to-be-executed vector instruction needs to write back, a number of required number-of-effective-elements indexes is VLEN×VREG_NUM/DPLEN.

In an embodiment of this disclosure, when VREG_NUM, the number of vector registers to which the to-be-executed vector instruction needs to write back is less than 8, uniform indexing is not used, but non-uniform indexing is used. In this way, regardless of a value of VREG_NUM, in solutions with different VREG_NUM, element ranges with the most significant bits are kept at close number-of-effective-elements indexes, and element ranges with the least significant bits are kept at close number-of-effective-elements indexes. To be specific, if VREG_NUM is relatively small, a difference between values of number-of-effective-elements indexes created for two adjacent element ranges is increased; or if VREG_NUM is relatively large, a difference between values of number-of-effective-elements indexes created for two adjacent element ranges is reduced. In this way, in case of different values of VREG_NUM, element ranges with approximately the same position ratio in a total element range are coded into similar number-of-effective-elements index values. This provides an appropriate basis for subsequently comparing a number-of-effective-elements index of a microinstruction acquired by splitting a vector instruction with the first index, thereby avoiding adverse impact on the comparison due to different VREG_NUM of the vector instruction and a previous fault-only-first vector loading instruction.

Specifically, in an embodiment, for a common vector instruction following a fault-only-first vector loading instruction, the microinstruction index fetcher 1303 acquires a number-of-effective-elements index through coding based on an element range involved in microinstructions resulting from the splitting and according to the following formula 1:

$$vl\_index(i)=8\times(i+1)/VREG\_NUM-1 \quad \text{Formula 1, where}$$

vl_index(i) is the number-of-effective-elements index, VREG_NUM is a number of vector registers to which the to-be-executed vector instruction needs to write back, i is a sequence number of the element range, and i=0, 1, 2, . . . , VLEN×VREG_NUM/DPLEN−1 (sequence numbers are incremented in ascending order of bits), where VLEN is a bit width of a vector register, and DPLEN is a processing bit width of the vector execution unit.

The bit width of the vector register is VLEN, the number of vector registers to which the to-be-executed vector instruction needs to write back is VREG_NUM, and the processing bit width of the vector execution unit is DPLEN. Therefore, an overall vector register group for writeback is divided into VLEN×VREG_NUM/DPLEN element ranges based on DPLEN. The smallest element range sequence number is 0, the second smallest element range sequence number is 1, . . . , and the largest element range sequence number is VLEN×VREG_NUM/DPLEN−1.

If VREG_NUM=8, the element range sequence number is the number-of-effective-elements index, because by substituting VREG_NUM=8 into the formula 1, it is learned that the number of effective elements_index(i)=i. When the number-of-effective-elements index is expressed in binary, an element range that has the smallest sequence number and that corresponds to a microinstruction acquired by splitting the to-be-executed vector instruction is coded into a number-of-effective-elements index 0000. As the element range sequence number is incremented by 1, the coded number-of-effective-elements index is incremented by 0001, and may be incremented to a maximum of 1111, as shown in FIG. 12.

If VREG_NUM=4, by substituting VREG_NUM=4 into the formula 1, it is learned that the number of effective elements_index(i)=2i+1. When i=0, the number-of-effective-elements index is 1; when i=1, the number-of-effective-elements index is 3; when i=2, the number-of-effectiveelements index is 5; when i=3, the number-of-effective-elements index is 7; . . . ; and when i=7, the number-of-effective-elements index is 15. Possible binary number-of-effective-elements indexes are 0001, 0011, 0101, 0111, . . . , and 1111. An element range that has the smallest sequence number and that is involved in a microinstruction acquired by splitting the to-be-executed vector instruction is coded into a number-of-effective-elements index 0001. As the element range sequence number is incremented by 1, the coded number-of-effective-elements index is incremented by 0010, and may be incremented to a maximum of 1111, as shown in FIG. 12. It can be learned that, although VREG_NUM varies, a finally acquired number-of-effective-elements index corresponding to an element range with a high sequence number is similar to that in case of VREG_NUM=8, and a number-of-effective-elements index corresponding to an element range with a low sequence number is also similar to that in case of VREG_NUM=8, except that a difference between number-of-effective-elements indexes corresponding to adjacent element ranges is increased.

If VREG_NUM=2, by substituting VREG_NUM=2 into the formula 1, it is learned that the number of effective elements_index(i)=4i+3. When i=0, the number-of-effective-elements index is 3; when i=1, the number-of-effective-elements index is 7; when i=2, the number-of-effective-elements index is 11; and when i=3, the number-of-effective-elements index is 15. Possible binary number-of-effective-elements indexes are 0011, 0111, 1011, and 1111. An element range that has the smallest sequence number and that corresponds to a microinstruction acquired by splitting the to-be-executed vector instruction is coded into a number-of-effective-elements index 0011. As the element range sequence number is incremented by 1, the coded number-of-effective-elements index is incremented by 0100, and may be incremented to a maximum of 1111, as shown in FIG. 12. It can be learned that, although VREG_NUM varies, a finally acquired number-of-effective-elements index corresponding to an element range with a high sequence number is similar to that in case of VREG_NUM=4, and a number-of-effective-elements index corresponding to an element range with a low sequence number is also similar to that in case of VREG_NUM=4, except that a difference between number-of-effective-elements indexes corresponding to adjacent element ranges is further increased.

If VREG_NUM=1, by substituting VREG_NUM=1 into the formula 1, it is learned that the number of effective elements_index(i)=8i+7. When i=0, the number-of-effective-elements index is 7; and when i=1, the number-of-effective-elements index is 15. Possible binary number-of-effective-elements indexes are 0111 and 1111. An element range that has the smallest sequence number and that corresponds to a microinstruction acquired by splitting the to-be-executed vector instruction is coded into a number-of-effective-elements index 0111. As the element range sequence number is incremented by 1, the coded number-of-effective-elements index is incremented by 1000, and may be incremented to a maximum of 1111, as shown in FIG. 12. It can be learned that, although VREG_NUM varies, a finally acquired number-of-effective-elements index corresponding to an element range with a high sequence number is similar to that in case of VREG_NUM=2, and a number-of-effective-elements index corresponding to an element range with a low sequence number is also similar to that in case of VREG_NUM=2, except that a difference between number-of-effective-elements indexes corresponding to adjacent element ranges is increased furthermore.

The foregoing code increment rule may be understood by using fractional ratios. When writeback is performed on eight vector registers, each 64-bit element range accounts for $\frac{1}{16}$ of the total element range. Therefore, incrementing is performed based on $\frac{1}{16}$ of a maximum increment 16, that is, an increment is 1. When writeback is performed on four vector registers, each 64-bit element range accounts for $\frac{1}{8}$ of the total element range. Therefore, incrementing is performed based on $\frac{1}{8}$ of the maximum increment 16, namely, $\frac{2}{16}$, that is, an increment is 2. When writeback is performed on two vector registers, each 64-bit element range accounts for $\frac{1}{4}$ of the total element range. Therefore, incrementing is performed based on $\frac{1}{4}$ of the maximum increment 16, namely, $\frac{4}{16}$, that is, an increment is 4. When writeback is performed on one vector register, each 64-bit element range accounts for $\frac{1}{2}$ of the total element range. Therefore, incrementing is performed based on $\frac{1}{2}$ of the maximum increment 16, namely, $\frac{8}{16}$, that is, an increment is 8.

In this coding method, an element range is not coded by using an absolute total number of elements, but is coded based on a ratio of an element range involved in each microinstruction resulting from the splitting to the total element range. In this way, a change of the total number of elements with SEW can be ignored. In addition, a proportion of elements is used for illustration, which is more conducive to processing of some special vector extension instructions in the free and open reduced instruction set architecture, for example, narrowing (narrowing) and widening (widening) instructions and some mask (mask) instructions. Although a total number of elements in these instructions remains the same, a number of registers for writeback is different from that in a common instruction due to a change of SEW. However, in the foregoing coding method, coding can be directly performed regardless of the change of SEW, so that processing is simple. Although a number-of-effective-elements index may also be directly acquired through coding based on a sequence number of an element range involved in a microinstruction, in this coding method, the number of elements changes with SEW. A total number of indexes resulting from elements is VLEN×VREG_NUM/SEW. When SEW is less than DPLEN (SEW is usually less than DPLEN), a greater bit width is required for an index, and SEW needs to be considered during coding.

As shown in FIG. 13, the instruction B in FIG. 13 is a common vector instruction. DPLEN is a bit width of two elements. Each microinstruction acquired by splitting the instruction B involves two elements. When the first two microinstructions are executed, element ranges involved in the microinstructions all correspond to an element range of elements 0 to 3 (adjacent four elements are an element range), and coded number-of-effective-elements indexes are all 0001. When the $3^{rd}$ to $4^{th}$ microinstructions in ascending order are executed, element ranges involved in the microinstructions all correspond to an interval of elements 4 to 7, and a coded number-of-effective-elements index is 0011.

Then the index comparison subunit 1304 compares the coded number-of-effective-elements index with the first index. The first index is a number-of-effective-elements index of a fault-only-first microinstruction whose processing has not been completed by the vector execution unit 1211. If a plurality of fault-only-first microinstructions have not been fully processed, the coded number-of-effective-elements index needs to be compared with number-of-effective-elements indexes of the plurality of fault-only-first microinstructions. The microinstruction may be transmitted to the vector execution unit 1211 for execution only when the coded number-of-effective-elements index is less than all the number-of-effective-elements indexes of the plurality of fault-only-first microinstructions.

The vector execution unit 1211 includes a vector operation subunit 1213 and a first index recorder 1212. The vector operation subunit 1213 executes a microinstruction that is acquired by splitting the to-be-executed vector instruction and that is transmitted by the instruction transmitting unit 130. The first index recorder 1212 records the first index and transmits the first index in response to a request of the instruction transmitting unit 130.

As shown in FIG. 13, an instruction A is a fault-only-first vector loading instruction. An instruction B is a widening (widening) instruction following the instruction A. Each instruction acquired by splitting the instruction A and the instruction B performs processing and writes back a result for elements of the DPLEN bit width. For the instruction A, DPLEN is a bit width of four elements. Assuming that a current microinstruction acquired by splitting the instruction A is a microinstruction A-2, according to the rules in the foregoing descriptions, a number-of-effective-elements index of the microinstruction is coded as 0101. Microinstructions that are resulting from the splitting and that have been transmitted to the vector operation subunit 1213 are a microinstruction A-0 and a microinstruction A-1. A microinstruction B-0 and a microinstruction B-1 that are acquired by splitting the instruction B act on an element range of elements 0 to 3. Therefore, according to the rules in the foregoing descriptions, a number-of-effective-elements index of the microinstructions is coded as 0001. The index comparison subunit 1304 requests the first index recorder 1212 for number-of-effective-elements indexes of A-0, A-1, . . . whose execution has not been completed. Because the coded number-of-effective-elements index 0001 is not less than an index of A-0, the microinstructions need to wait until execution of A-0 is completed and update information of a number of effective elements is confirmed, and then may be transmitted. For microinstructions B-2 and B-3 that are acquired by splitting the instruction B, according to the rules in the foregoing descriptions, a number-of-effective-elements index of the microinstructions is coded as 0011. The index comparison subunit 1304 requests the first index recorder 1212 for number-of-effective-elements indexes 0001 and 0011 of A-0 and A-1 whose execution has not been completed. Because 0011 is not less than the indexes 0001 and 0011 of A-0 and A-1, . . . , the microinstructions need to wait until execution of both A-0 and A-1 is completed and update information of a number of effective elements is confirmed, and then may be transmitted. A number-of-effective-elements index of microinstructions B-4 and B-5 that are acquired by splitting the instruction B is 0101. The index comparison subunit 1304 requests the first index recorder 1212 for number-of-effective-elements indexes 0001, 0011, and 0101 of A-0, A-1, and A-2 whose execution has not been completed. Because 0101 is not less than the indexes of A-0, A-1, and A-2, even if execution of A-0 and A-1 has been completed in the vector operation subunit 1213, A-0 and A-1 cannot be executed and transmitted in advance by skipping the microinstruction A-2, but need to wait until A-2 is also transmitted and executed.

If the coded number-of-effective-elements index is less than the first index, the microinstruction transmission controller 1305 transmits the microinstruction resulting from the splitting to the vector operation subunit 1213 in the vector execution unit 1211 for execution.

In the foregoing embodiment, it is merely determined whether the number-of-effective-elements index is less than the first index. In another embodiment, in addition to the foregoing judgment, it further needs to be determined whether a first microinstruction is fully executed. As shown in FIG. 3, the instruction transmitting unit 130 further includes an operand correlation judgment subunit 1302 adapted to determine whether execution of a first microinstruction is completed, where operands in the microinstructions resulting from the splitting depend on the first microinstruction. The microinstruction transmission controller 1305 transmits the microinstructions resulting from the splitting to the vector execution unit 1211 for execution only when the execution of the first microinstruction is completed and the number-of-effective-elements index is less than the first index.

Operands in the microinstructions resulting from the splitting depend on an execution result of the first microinstruction. In other words, the microinstructions resulting from the splitting can be executed only after the execution result of the first microinstruction is acquired. Before a microinstruction resulting from the splitting is executed, it is determined whether a previous microinstruction on which the microinstruction depends has been fully executed. This is a general condition required for chaining. After the judgment on the general condition is completed, a judgment is performed on the specific condition in the embodiments of this disclosure: whether the number-of-effective-elements index is less than the first index. In this way, execution can be performed without waiting until execution of a previous fault-only-first vector loading instruction is fully completed and an updated value of a number of effective elements is returned, thereby greatly improving operating efficiency of vector instructions following the fault-only-first vector loading instruction in chaining.

If the first microinstruction has not been fully executed or the coded number-of-effective-elements index is not less than the first index, the microinstruction transmission controller 1305 cannot transmit the microinstruction resulting from the splitting to the vector operation subunit 1213 in the vector execution unit 1211 for execution, but retains the microinstruction resulting from the splitting until the condition is met. The operand correlation judgment subunit 1302, the index comparison subunit 1304, and the microinstruction transmission controller 1305 operate periodically. Therefore, if the condition is not met in a clock cycle, it can be repeatedly determined in each subsequent clock cycle whether the condition is met, until the condition is met. Then the microinstruction resulting from the splitting is transmitted to the vector operation subunit 1213 for execution.

In addition, the vector execution unit 1211 may include a plurality of vector operation subunits 1213. The microinstruction transmission controller 1305 may transmit a plurality of microinstructions resulting from the splitting to the plurality of vector operation subunits 1213 for parallel execution, to improve execution efficiency.

The operand correlation judgment subunit 1302 determines whether execution of the first microinstruction is completed. Operands in the microinstructions resulting from the splitting depend on the first microinstruction.

An operand is an entity on which an operator in a to-be-executed vector instruction acts. The operand specifies an amount on which an operation in the to-be-executed vector instruction is to be performed. For example, a vector multiplication instruction vmul.vv vr4,vr0,vr3 means multiplying a a vector vr0 and a vector vr3, and using a resulting vector as a new vector vr4. Herein, the vector vr4, the vector vr0, and the vector vr3 are all operands required for the vector multiplication instruction.

If an operand is exactly an execution result of a previous microinstruction of a current microinstruction, the previous microinstruction is the first microinstruction. For example, there is a vector addition instruction vadd.vv vr0,vr1,vr2 before vmul.vv vr4,vr0,vr3. The vector addition instruction means adding a vector vr1 and a vector vr2, and using a resulting vector as a new vector vr0. Therefore, the operand vr0 required in the vector multiplication instruction vmul.vv vr4,vr0,vr3 is an execution result of vadd.vv vr0,vr1,vr2, and vadd.vv vr0,vr1,vr2 is the first microinstruction. Assuming that the vector execution unit 1211 is capable of handling operations on four elements at a time, a microinstructions that handles elements 4 to 7 of the vector multiplication instruction vmul.vv vr4,vr0,vr3 needs to depend on an execution result of a microinstruction used for elements 0 to 3 in the vector addition instruction vadd.vv vr0,vr1,vr2. Therefore, when the operand correlation judgment subunit 1302 executes the microinstruction used for the elements 4 to 7 in the vector multiplication instruction vmul.vv vr4, vr0,vr3, it needs to be determined whether execution of the microinstruction used for the elements 0 to 3 in the vector addition instruction vadd.vv vr0,vr1,vr2 is completed. If yes, the process may proceed to a subsequent judgment. Otherwise, the process cannot proceed to a subsequent judgment, because processing of the microinstruction on which the operand depends is not completed, and a chaining condition is not met. This step is performed periodically. Therefore, although execution of the microinstruction on which the operand required for the microinstruction resulting from the splitting depends is not completed in the current clock cycle, the execution may be completed in a next clock cycle.

As shown in FIG. 9, it is assumed that an instruction B is a vector multiplication instruction vmul.vv vr4,vr0,vr3, a microinstruction B-1 is a microinstruction used for processing elements 0 to 3 in the instruction B, B-2 is a microinstruction used for processing elements 4 to 7 in the instruction B, B-3 is a microinstruction used for processing elements 8 to 11 in the instruction B, . . . ; and an instruction A is a vector addition instruction vadd.vv vr0,vr1,vr2, a microinstruction A-1 is a microinstruction used for processing elements 0 to 3 in the instruction A, A-2 is a microinstruction used for processing elements 4 to 7 in the instruction A, A-3 is a microinstruction used for processing elements 8 to 11 in the instruction A, . . . In a clock cycle 1, the microinstruction A-1 may be transmitted for processing. In a clock cycle 2, the microinstruction A-2 may be processed. In addition, processing of the previous microinstruction A-1 on which the microinstruction B-1 depends is completed, and the microinstruction B-1 may also be processed. Therefore, both the microinstructions A-2 and B-1 may be processed in the clock cycle 2, and both the microinstructions A-3 and B-2 may be processed in a clock cycle 3, . . . , thereby achieving a chaining effect and effectively reducing a waiting delay caused by an operand correlation.

For determining whether execution of a microinstruction that an operand required for a microinstruction resulting from the splitting depends on is completed, the operand correlation judgment subunit 1302 may first obtain the operand in the microinstruction resulting from the splitting, and then acquire, from microinstructions resulting from previous splitting, a microinstruction that generates the operand, and then determine whether execution of the acquired microinstruction is completed. In the foregoing example, the operands vr4, vr0, and vr3 required for the microinstruction that is used for the elements 4 to 7 and that is acquired by splitting the vector multiplication instruction vmul.vv vr4,vr0,vr3 are acquired. For vr4, vr0, and vr3, microinstructions resulting from previously splitting are searched for a microinstruction whose execution result includes vr4, vr0, and vr3. A microinstruction used for elements 0 to 3 and acquired by splitting the vector addition instruction vadd.vv vr0,vr1,vr2 is finally found. Finally, it is determined that execution of the microinstruction used for elements 0 to 3 and acquired by splitting vadd.vv vr0,vr1,vr2 is completed.

Figure 14:
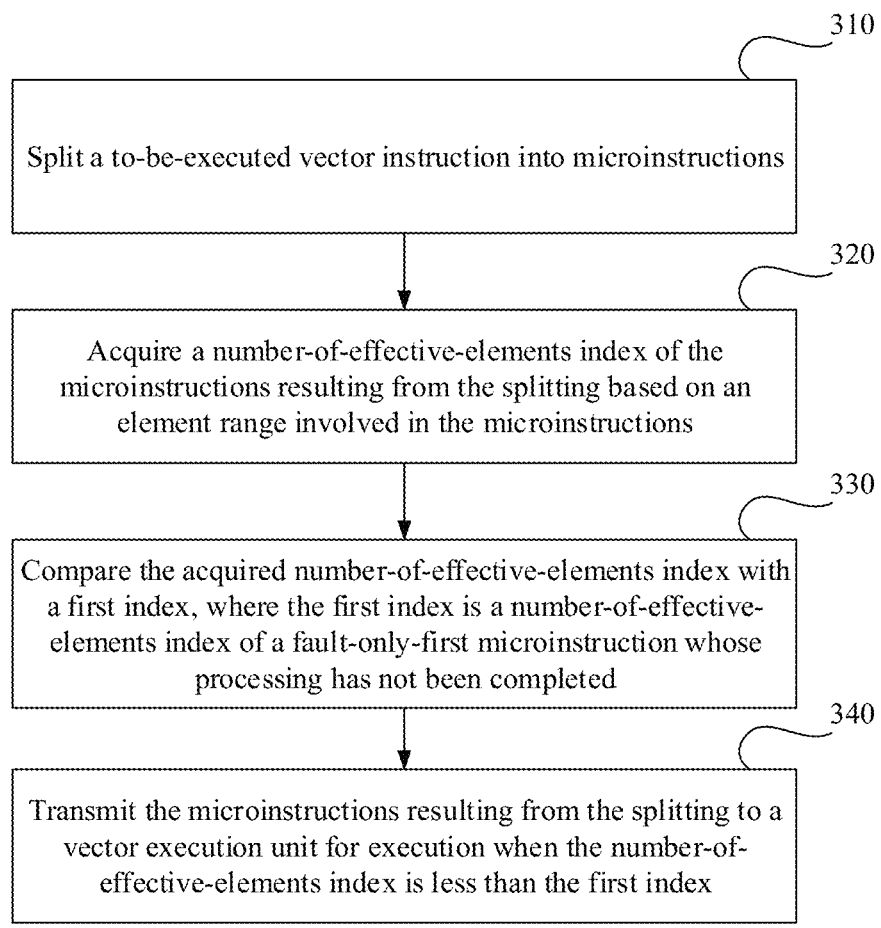
FIG. 14 is a flowchart of a vector execution acceleration method according to an embodiment of this disclosure.

As shown in FIG. 14, according to an embodiment of this disclosure, a vector execution acceleration method is provided. The method is performed by the instruction transmitting unit 130 and includes the following steps.

Step 310: Split a to-be-executed vector instruction into microinstructions.

Step 320: Acquire a number-of-effective-elements index of the microinstructions resulting from the splitting based on an element range involved in the microinstructions.

Step 330: Compare the acquired number-of-effective-elements index with a first index, where the first index is a number-of-effective-elements index of a fault-only-first microinstruction whose processing has not been completed.

Step 340: Transmit the microinstructions resulting from the splitting to a vector execution unit for execution when the number-of-effective-elements index is less than the first index.

Optionally, before step 340, the method further includes: determining whether execution of a first microinstruction is completed, where operands in the microinstructions resulting from the splitting depend on the first microinstruction; and step 340 includes: transmitting the microinstructions resulting from the splitting to the vector execution unit for execution only when the execution of the first microinstruction is completed and the number-of-effective-elements index is less than the first index.

Optionally, step 340 includes: calculating the number-of-effective-elements index according to the following formula:

$$vl\_index(i)=8\times(i+1)/VREG\_NUM-1, \text{ where}$$

vl_index(i) is the number-of-effective-elements index, VREG_NUM is a number of vector registers to which the to-be-executed vector instruction needs to write back, i is a sequence number of the element range, and i=0, 1, 2, . . . , VLEN×VREG_NUM/DPLEN−1, where VLEN is a bit width of a vector register, and DPLEN is a processing bit width of the vector execution unit.

Optionally, if VREG_NUM=8, a number-of-effective-elements index corresponding to an element range with the smallest sequence number is 0000, and with each addition of 1 to the sequence number of the element range, the number-of-effective-elements index is incremented by 0001.

Optionally, if VREG_NUM=4, a number-of-effective-elements index corresponding to an element range with the smallest sequence number is 0001, and with each addition of 1 to the sequence number of the element range, the number-of-effective-elements index is incremented by 0010.

Optionally, if VREG_NUM=2, a number-of-effective-elements index corresponding to an element range with the smallest sequence number is 0011, and with each addition of 1 to the sequence number of the element range, the number-of-effective-elements index is incremented by 0100.

Optionally, if VREG_NUM=1, a number-of-effective-elements index corresponding to an element range with the smallest sequence number is 0111, and with each addition of 1 to the sequence number of the element range, the number-of-effective-elements index is incremented by 1000.

Optionally, the determining whether execution of a first microinstruction is completed includes:

acquiring an operand in a microinstruction resulting from the splitting;

acquiring, from microinstructions resulting from previous splitting, a microinstruction that generates the operands; and determining whether execution of the acquired microinstruction is completed.

Optionally, after the determining whether execution of a first microinstruction is completed, the method further includes: retaining the microinstructions resulting from the splitting when the execution of the first microinstruction has not been completed or the number-of-effective-elements index is less than the first index.

This application further discloses a computer-readable storage medium that stores computer-executable instructions. When the computer-executable instructions are executed by a processor, the processor performs the methods in the embodiments described in this specification.

It should be understood that the foregoing descriptions are merely preferred embodiments of the present invention, but are not intended to limit the present invention. For those skilled in the art, there are many variations to the embodiments in this specification. Any modification, equivalent replacement, or improvement made within the spirit and principle of the present invention shall fall within the protection scope of the present invention.

It should be understood that the embodiments in this specification are described in a progressive manner. For a part that is the same or similar between different embodiments, reference may be made between the embodiments. Each embodiment focuses on differences from other embodiments. In particular, the method embodiment is essentially similar to the methods described in the apparatus and system embodiments, and therefore is described briefly. For related information, refer to descriptions of related parts in other embodiments.

It should be understood that the foregoing describes specific embodiments in this specification. Other embodiments fall within the scope of the claims. In some cases, the actions or steps recorded in the claims may be performed in a different order than in the embodiments but still achieve a desired result. In addition, the processes depicted in the drawings do not necessarily require the shown specific order or sequential order to achieve the desired result. In some embodiments, multitasking and parallel processing may be possible or advantageous.

It should be understood that an element described in a singular form in this specification or shown as only one element in the drawings does not mean that there is only one element. In addition, separate modules or elements described or shown in this specification may be combined into a single module or element, and a single module or element described or shown in this specification may be split into a plurality of modules or elements.

It should be further understood that the terms and expressions used in this specification are merely intended for description, and one or more embodiments in this specification should not be limited to these terms or expressions. The use of these terms and expressions does not mean to exclude any illustrated or described equivalent features (or a part of them). It should be recognized that various possible modifications should also be included in the scope of the claims. Other modifications, variations, and replacements are also possible. Accordingly, the claims should be regarded as covering all these equivalents.

What is claimed is:

1. An instruction transmitting unit, comprising:
an instruction splitter adapted to split a to-be-executed vector instruction into microinstructions;
a microinstruction index fetcher adapted to acquire a number-of-effective-elements index of the microinstructions resulting from the splitting based on an element range involved in the microinstructions;
an index comparison subunit adapted to compare the acquired number-of-effective-elements index with a first index, wherein the first index is a number-of-effective-elements index of a fault-only-first microinstruction whose processing has not been completed; and
a microinstruction transmission controller adapted to transmit the microinstructions resulting from the splitting to a vector execution unit for execution when the number-of-effective-elements index is less than the first index.

2. The instruction transmitting unit according to claim 1, further comprising:
an operand correlation judgment subunit adapted to determine whether execution of a first microinstruction is completed, wherein operands in the microinstructions resulting from the splitting depend on the first microinstruction; and
the microinstruction transmission controller transmits the microinstructions resulting from the splitting to the vector execution unit for execution when the execution of the first microinstruction is completed and the number-of-effective-elements index is less than the first index.

3. The instruction transmitting unit according to claim 1, wherein the microinstruction index fetcher acquires the number-of-effective-elements index of the microinstructions resulting from the splitting based on the element range involved in the microinstructions according to the following formula:

$$vl\_index(i)=8\times(i+1)/VREG\_NUM-1, \text{ wherein}$$

vl_index(i) is the number-of-effective-elements index, VREG_NUM is a number of vector registers to which the to-be-executed vector instruction needs to write back, i is a sequence number of the element range, and i=0, 1, 2, . . . , VLEN×VREG_NUM/DPLEN−1, wherein VLEN is a bit width of a vector register, and DPLEN is a processing bit width of the vector execution unit.

4. The instruction transmitting unit according to claim 3, wherein if VREG_NUM=8, a number-of-effective-elements index corresponding to an element range with the smallest sequence number is 0000, and with each addition of 1 to the sequence number of the element range, the number-of-effective-elements index is incremented by 0001.

5. The instruction transmitting unit according to claim 3, wherein if VREG_NUM=4, a number-of-effective-elements index corresponding to an element range with the smallest sequence number is 0001, and with each addition of 1 to the sequence number of the element range, the number-of-effective-elements index is incremented by 0010.

6. The instruction transmitting unit according to claim 3, wherein if VREG_NUM=2, a number-of-effective-elements index corresponding to an element range with the smallest sequence number is 0011, and with each addition of 1 to the sequence number of the element range, the number-of-effective-elements index is incremented by 0100.

7. The instruction transmitting unit according to claim 3, wherein if VREG_NUM=1, a number-of-effective-elements index corresponding to an element range with the smallest sequence number is 0111, and with each addition of 1 to the sequence number of the element range, the number-of-effective-elements index is incremented by 1000.

8. The instruction transmitting unit according to claim 1, wherein the instruction splitter splits the to-be-executed vector instruction into (VLEN·LMUL)/DPLEN microinstructions, VLEN is a bit width of a vector register, LMUL is a number of vector registers occupied by vectors in the to-be-executed vector instruction, and DPLEN is a processing bit width of the vector execution unit.

9. The instruction transmitting unit according to claim 2, wherein the operand correlation judgment subunit determines, in the following manner, whether the execution of the first microinstruction is completed:
- acquiring an operand in a microinstruction resulting from the splitting;
- acquiring, from microinstructions resulting from previous splitting, a microinstruction that generates the operand; and
- determining whether execution of the acquired microinstruction is completed.

10. The instruction transmitting unit according to claim 2, wherein the microinstruction transmission controller retains the microinstructions resulting from the splitting when the execution of the first microinstruction has not been completed or the number-of-effective-elements index is less than the first index.

11. The instruction transmitting unit according to claim 2, wherein the vector execution unit comprises a plurality of vector operation subunits, and the microinstruction transmission controller transmits the microinstructions resulting from the splitting to the plurality of vector operation subunits in parallel for execution.

12. A vector execution acceleration method, comprising:
- splitting a to-be-executed vector instruction into microinstructions;
- acquiring a number-of-effective-elements index of the microinstructions resulting from the splitting based on an element range involved in the microinstructions;
- comparing the acquired number-of-effective-elements index with a first index, wherein the first index is a number-of-effective-elements index of a fault-only-first microinstruction whose processing has not been completed; and
- transmitting the microinstructions resulting from the splitting to a vector execution unit for execution when the number-of-effective-elements index is less than the first index.

13. The method according to claim 12, wherein before the transmitting the microinstructions resulting from the splitting to a vector execution unit for execution, the method further comprises: determining whether execution of a first microinstruction is completed, wherein operands in the microinstructions resulting from the splitting depend on the first microinstruction; and
the transmitting the microinstructions resulting from the splitting to a vector execution unit for execution when the number-of-effective-elements index is less than the first index comprises: transmitting the microinstructions resulting from the splitting to the vector execution unit for execution only when the execution of the first microinstruction is completed and the number-of-effective-elements index is less than the first index.

14. The method according to claim 12, wherein the acquiring a number-of-effective-elements index of the microinstructions resulting from the splitting based on an element range involved in the microinstructions comprises: calculating the number-of-effective-elements index according to the following formula:

$$vl\_index(i) = 8 \times (i+1)/VREG\_NUM - 1, \text{ wherein}$$

vl_index(i) is the number-of-effective-elements index, VREG_NUM is a number of vector registers to which the to-be-executed vector instruction needs to write back, i is a sequence number of the element range, and i=0, 1, 2, . . . , VLEN×VREG_NUM/DPLEN−1, wherein VLEN is a bit width of a vector register, and DPLEN is a processing bit width of the vector execution unit.

15. The method according to claim 14, wherein if VREG_NUM=8, a number-of-effective-elements index corresponding to an element range with the smallest sequence number is 0000, and with each addition of 1 to the sequence number of the element range, the number-of-effective-elements index is incremented by 0001.

16. The method according to claim 14, wherein if VREG_NUM=4, a number-of-effective-elements index corresponding to an element range with the smallest sequence number is 0001, and with each addition of 1 to the sequence number of the element range, the number-of-effective-elements index is incremented by 0010.

17. The method according to claim 14, wherein if VREG_NUM=2, a number-of-effective-elements index corresponding to an element range with the smallest sequence number is 0011, and with each addition of 1 to the sequence number of the element range, the number-of-effective-elements index is incremented by 0100.

18. The method according to claim 14, wherein if VREG_NUM=1, a number-of-effective-elements index corresponding to an element range with the smallest sequence number is 0111, and with each addition of 1 to the sequence number of the element range, the number-of-effective-elements index is incremented by 1000.

19. The method according to claim 13, wherein the determining whether execution of a first microinstruction is completed comprises:
- acquiring an operand in a microinstruction resulting from the splitting;
- acquiring, from microinstructions resulting from previous splitting, a microinstruction that generates the operand; and
- determining whether execution of the acquired microinstruction is completed.

20. The method according to claim 13, wherein after the determining whether execution of a first microinstruction is completed, the method further comprises:
- when the execution of the first microinstruction has not been completed or the number-of-effective-elements index is less than the first index, retaining the microinstructions resulting from the splitting.

* * * * *